US006690851B1

(12) United States Patent
Guilfoyle

(10) Patent No.: US 6,690,851 B1
(45) Date of Patent: Feb. 10, 2004

(54) VIRTUAL OPTOELECTRONIC CROSSBAR SWITCH

(75) Inventor: Peter S. Guilfoyle, Zephyr Cove, NV (US)

(73) Assignee: Opticomp Corporation, Zephyr Cove, NV (US)

( * ) Notice: Subject to any disclaimer, the term of this patent is extended or adjusted under 35 U.S.C. 154(b) by 0 days.

(21) Appl. No.: 10/077,311

(22) Filed: Feb. 15, 2002

Related U.S. Application Data

(63) Continuation of application No. 09/867,792, filed on May 29, 2001.
(60) Provisional application No. 60/207,498, filed on May 26, 2000.

(51) Int. Cl.[7] .......................... G02B 6/28; G02B 6/34; G02B 6/42

(52) U.S. Cl. .......................... 385/18; 385/24; 385/37; 385/17

(58) Field of Search .......................... 385/16–18, 24, 385/37

(56) References Cited

U.S. PATENT DOCUMENTS 5,247,593 A * 9/1993 Lin et al. .................... 385/17
5,255,332 A * 10/1993 Welch et al. ................ 385/17
5,337,183 A * 8/1994 Rosenblatt ................. 359/248

* cited by examiner

*Primary Examiner*—Akm E. Ullah
*Assistant Examiner*—Jerry T Rahll
(74) *Attorney, Agent, or Firm*—Gray, Cary, Ware & Freidenrich LLP

(57) ABSTRACT

A virtual distributed optical crossbar local area network configuration where the central switch or network controller has been eliminated. A virtual distributed optical crossbar allows a network to be fully scalable as the number of users increases. The virtual distributed optical crossbar is fully non-blocking and is reconfigurable. In addition the virtual distributed optical crossbar has zero latency across the network, employs vertical cavity surface emitting laser technology and smart pixel technology in conjunction with a resonant cavity enhanced (RCE) waveguide grating coupler (WGC). Optical signals are transmitted through fiber optic and/or waveguide or freespace interconnects implementing the switching functions. The waveguide technology provides the enabling mechanism to achieve a zero latency, fully non-blocking, performance. Address decoding functions between processors is divided, leaving only the true distance interconnect implemented by optical means. Unique to this architecture is it eliminates the central switches and servers within telecommunications networks. The architecture is clock rate reconfigurable performing crossconnect switching within single clock cycles.

18 Claims, 30 Drawing Sheets

First Stage (Electronic)

| $\overline{a_0}$ | $\overline{a_1}$ | $a_0$ | $a_1$ | $S_1(t)$ | $AO_0$ | $AO_1$ | $AO_2$ | $AO_3$ |
|---|---|---|---|---|---|---|---|---|
| 1 | 0 | 0 | 1 | $S_1(t)$ | $\overline{S_1(t)}$ | 0 | 0 | 0 |
| 1 | 1 | 0 | 0 | $S_1(t)$ | 0 | $\overline{S_1(t)}$ | 0 | 0 |
| 0 | 0 | 1 | 1 | $S_1(t)$ | 0 | 0 | $\overline{S_1(t)}$ | 0 |
| 0 | 1 | 1 | 0 | $S_1(t)$ | 0 | 0 | 0 | $\overline{S_1(t)}$ |

Second Stage (Optical)

| $AO_0$ | $AO_1$ | $AO_2$ | $AO_3$ | $O_0$ |
|---|---|---|---|---|
| $\overline{S_1(t)}$ | 0 | 0 | 0 | $S_1(t)$ |
| 0 | $\overline{S_2(t)}$ | 0 | 0 | $S_2(t)$ |
| 0 | 0 | $\overline{S_3(t)}$ | 0 | $S_3(t)$ |
| 0 | 0 | 0 | $\overline{S_4(t)}$ | $S_4(t)$ |

VIRTUAL OPTOELECTRONIC CROSSBAR SWITCH

RELATED APPLICATION

This is a continuation of application Ser. No. 09/867,792 filed May 29, 2001.

The present application claims priority under 35 U.S.C. §119(e) from provisional application No. 60/207,498, filed May 26, 2000.

This invention was made with Government support under contact number DAAH01-01-C-R004 awarded by the Army Aviation and Missile Command. The Government has certain rights in the invention.

TECHNICAL FIELD

The present invention is directed generally to routing data among many possible points, and more particularly to a virtual optoelectronic crossbar switch.

BACKGROUND ART

The unprecedented growth in bandwidth is being facilitated by advances in optoelectronic technology. The increasing bandwidth of the internet which is causing data traffic to expand >200% per year has enabled higher performance from the peripheral networks. [Optoelectronic Industry Develop Assoc., Broadband Communications Technology Workshop, Palo Alto, Calif., April, 1999.] These include premises systems such as local area networks (LANs) and storage area networks (SANs) which implement Gigabit Ethernet (GbE), 10 GbE, and Fibre Channel protocols. The delivery of ultra-high band-width directly to the end user at the desktop over premises based networks remains a challenge using conventional switching architectures. As real-time applications are required, reducing the end-to-end latency is a primary problem which must be addressed in all networks. For example, high capacity network backbones are not available for on-demand service. In addition, high speed Internet transmission cannot be maintained without incurring packet loss.

Conventional optoelectronic crossbars require a central switching apparatus and choose to implement the address decode optically. This approach is inefficient and expensive.

SUMMARY OF THE INVENTION

The above and other problems and disadvantages of previous optoelectronic crossbar switches are overcome by the present invention of a virtual optoelectronic crossbar switch comprising a plurality of processor nodes, a plurality of optical paths, wherein each of the processor nodes includes a plurality of vertical cavity surface emitting laser diodes, one or more photodetectors; and a resonant cavity waveguide grating coupler positioned to couple light from the plurality of optical paths into the one or more photodetectors, and to couple light from the plurality of vertical cavity surface emitting laser diodes into the plurality of optical paths.

In another embodiment of the present invention, a network controller is provided which communicates with each of the plurality of processor nodes, and each of the plurality of processor nodes includes an address decoder which communicates with the network controller, and which enables ones of the plurality of vertical cavity surface emitting laser diodes in response to addresses from the network controller. Each of the plurality of vertical cavity surface emitting laser diodes is coupled by the resonant cavity waveguide grating coupler to a different one of plurality of optical paths, and a single photodetector is coupled to an assigned optical path.

In a still further embodiment of the present invention, for each of the plurality of processor nodes each of the plurality of vertical cavity surface emitting laser diodes is coupled by the resonant cavity waveguide grating coupler to a different one of plurality of optical paths. A first of the one or more photodetectors is coupled to an assigned optical path, and others of the one or more photodetectors are coupled to a different one of the plurality of optical paths and detect traffic on the assigned optical path.

In a further embodiment of the present invention, the plurality of optical paths are located in a single physical medium, and for each of the plurality of processor nodes each of the plurality of vertical cavity surface emitting laser diodes operate at different wavelengths, and the photodetectors are resonance cavity detectors.

In still another embodiment of the present invention, each of the plurality of processor nodes further includes additional pluralities of vertical cavity surface emitting laser diodes, wherein each of the plurality of vertical cavity surface emitting laser diodes in the additional groups operate at different wavelengths. Also provided are additional pluralities of photodetectors, wherein each photodetector in the additional pluralities of photodetectors groups is a resonant cavity enhanced photodetector responsive to a different wavelength.

The virtual optoelectronic crossbar switch of the present invention can significantly enhance end-to-end performance so that bandwidth-intensive applications can be realized. The virtual crossbar switch of the present invention is designed to eliminate central switching within a network while distributing the crossbar components. The virtual crossbar can be integrated into a LAN, metro network, WAN (wide area network) or SAN configuration for high speed networking. The age of "network-centric" computing has furthered the need for fiber optic links [C. DeCusatis, Optical Engineering, Vol. 37, No. 12, pp. 3082–3099, December, 1998]. Due to the complex graphics which generate large files, LAN systems are being forced to their limits [3 P. Lombardi, Telecommunications (International Edition), Vol. 33, No. 4, pp. 41–42, April, 1999].

FIG. 1 shows a virtual crossbar LAN configuration 10 in accordance with the present invention where the central switch has been eliminated. Unlike most premises based networks which consist of a hierarchy of central switches and servers, in the present invention the optical fiber 12 becomes the network. This optoelectronic configuration is particularly useful for high speed applications such as 10 GbE because the switching is implemented with zero latency across the network. Users will be able to achieve high-speed end-to-end delivery, extremes in network flows, and zero latency. The virtual crossbar allows the network to be scalable as the number of users increases. Scalability will be achieved by incorporating the company's parallel ($N^3$) and global ($N^4$) optical interconnect topology which utilizes high fan-in and fan-out as well as wavelength division multiplexing (WDM).

Additional tangible benefits to end users include full optical transparency, a large fully non-blocking reconfigurable crossbar, distributed cost, wide bandwidth per channel, dedicated channel interconnect, and adaptability to IP/WDM protocols. The virtual optoelectronic crossbar switch of the present invention also provides complementary hybrid optical/electronic systems and components that will remove network bottlenecks between the host and the bus. Considerable technical leverage in the network industry will be realized because the virtual crossbar will allow users to cost effectively upgrade their existing premises systems to achieve backbone functionality at the desktop. For new systems, it will provide a low cost approach to achieve high speed network functionality for fiber optic premises based networks. Several virtual optoelectronic system architectures have been developed which utilize optoelectronic integrated circuit (OEIC) device technologies as well as the VCSEL waveguide structure in accordance with the present invention.

These and other objectives, features and advantages of the present invention will be more readily understood upon considering the following detailed description of the invention and accompanying drawings.

BRIEF DESCRIPTION OF THE DRAWINGS

FIG. 25(*c*) interconnect metal.

DETAILED DESCRIPTION OF THE INVENTION

The present invention of a virtual crossbar system architecture capitalizes on the inherent benefits of free-space and fiber optical interconnects which include high fan-in and fan-out capability, low power consumption, high algorithmic efficiency. Planes of VLSI circuitry integrated with free-space optical interconnects offer potential advantages to all-electronic architectures which include:

- A lower energy per bit for short-distance interconnect architectures (100 mm to 10 cm),
- The ability to implement high fan-out and fan-in logic arrays that permit manipulation of large combinatorial minterms (a product of Boolean variables which are generated at the output of a single detector).
- Solutions to high-speed multichip module and chip-to-chip I/O interfaces.

Point-to-Point Interconnect—Data Links

Figure 1:
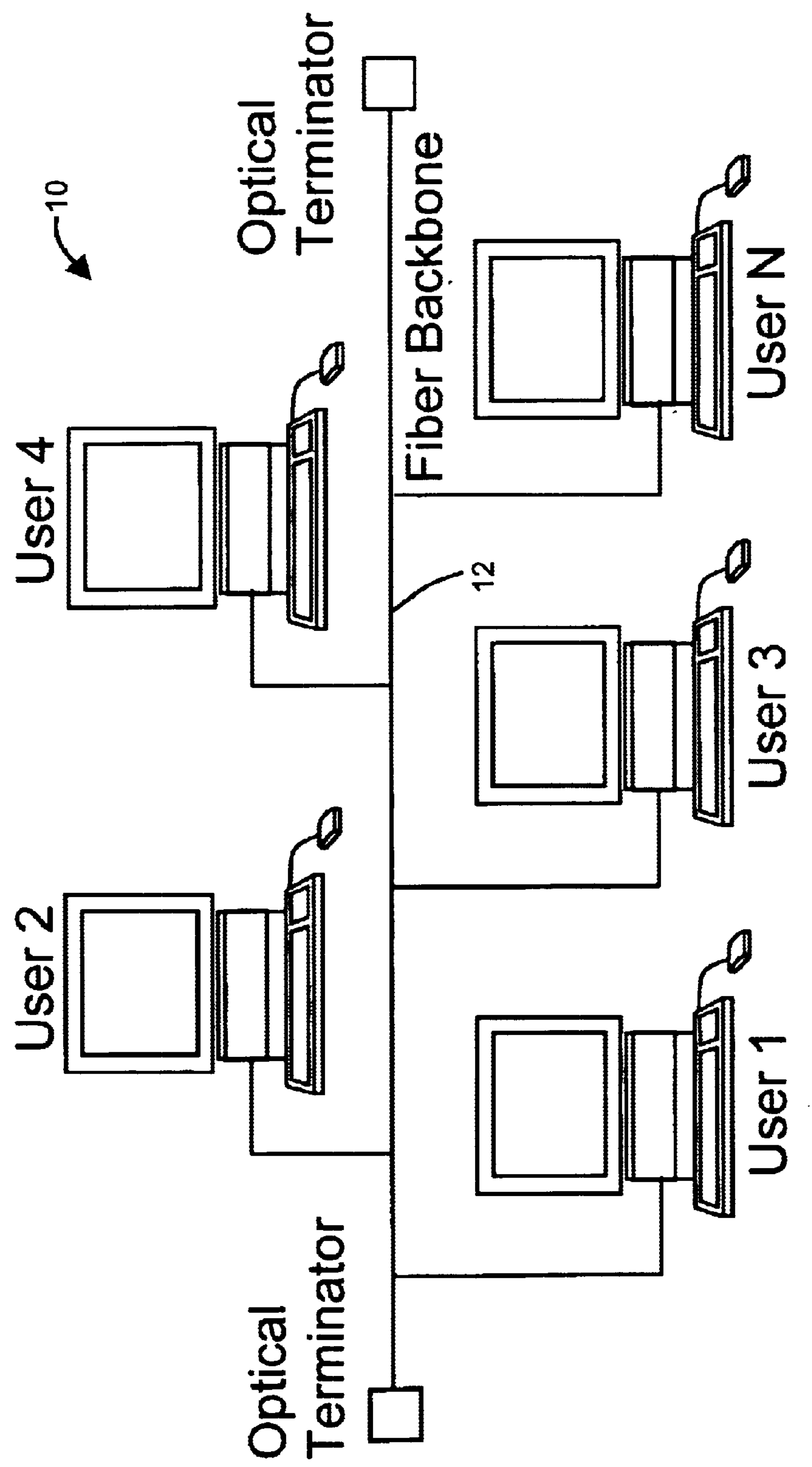
FIG. 1 is a virtual crossbar LAN configuration in accordance with the present invention where the central switch has been eliminated, and the optical fiber becomes the network.
Figure 2:
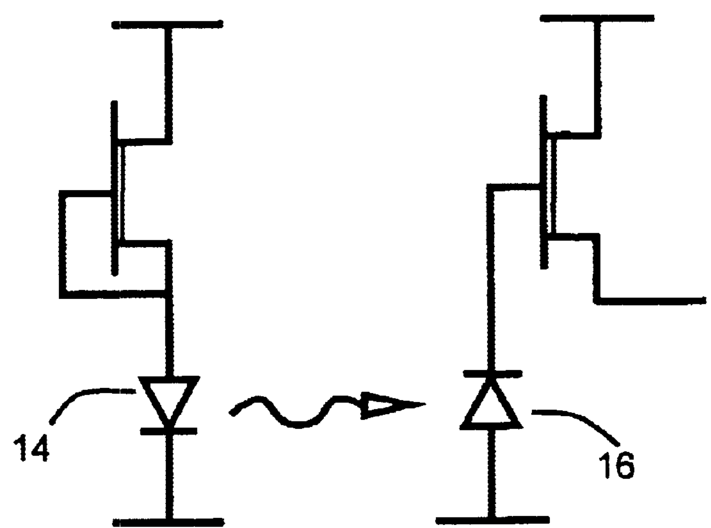
FIG. 2 illustrates a point-to-point interconnect—one source coupled to one detector.

The integration of VCSELs and photodetectors with Si-CMOS circuitry will ultimately have a significant impact in the production of low energy point-to-point optical data links. In FIG. 2, an light source 14 is shown transmitting to a corresponding detector 16.

Several studies [P. W. Smith, Bell System Technical Journal, 61, 1975 (1982); J. D. Meindl, Proc. IEEE, 83, 619 (1995); P. S. Guilfoyle et al, Opt. Eng., 35 (1996)] have suggested that the energy consumed (speed-power product) by data links will ultimately be the critical factor which limits the achievable switching time (i.e., speed) of "all-electronic" computers. In an analysis [J. D. Meindl, Proc. IEEE, 83, 619 (1995)] Meindl describes a hierarchical set of five limits to the ultimate performance of silicon microelectronics based on reasonable extrapolations of existing technology. Meindl uses each of these limits to disallow operation of Si-based processors in a region of a plot of the average power consumed by a switching transistor in a processor vs. the switching time. The limits are, in order of increasing constraint, fundamental, i.e., quantum mechanics and thermodynamics; material; device, i.e., transistor properties; circuit, i.e., logic gate layout; and system.

It has been previously contended [P. S. Guilfoyle et al, Opt. Eng., 35 (1996)] that the use of optical interconnects, for the simplest applications where only point-to-point interconnects are required, will ultimately allow the fabrication of information processing devices which have a lower average switching energy and therefore a lower average power consumption than the system limits previously suggested. For the processor studied by Meindl, which consisted of an array of connected macrocells, optical interconnects could be implemented by modifying the macrocell so that each contains optical transmitters and receivers and replacing the electrical wires connecting the macrocells with optical interconnections. It is fairly straightforward to make optical receivers with a sensitivity of ~1000 photons (−36.3 dBm for a 1 GHz bandwidth at 850 nm). The optical energy used to transfer one bit from one electronic gate to the next can therefore be as small as ~240 aJ for 850 nm photons, i.e., less than 1% of the energy per switch event cited in Reference [J. D. Meindl, Proc. IEEE, 83, 619 (1995].

One-Point-to-Many-Points (Fan-Out)—Low Power Chip-to-Chip Interconnects

A more immediate application of buried oxide VCSELs integrated with Si-CMOS is optical interconnects for on-chip clock distribution, chip-to-chip, and multi-chip module (MCM)-to-MCM communications.

There exists a critical distance above which it is energetically favorable to use optical interconnects to transfer information between chips. It can be shown that by using low-threshold VCSELs this energetically favorable distance range can be made to include the distances typically found in clock distribution, chip-to-chip (die-to-die), and MCM-to-MCM interconnect applications. The distance ranges over which optical interconnections are required to operate for various applications are described in the literature. [R. A. Nordin, A. F. J. Levi, et al., IEEE J. Lightwave Technol., 10, 811 (1992)]. Chip-to-chip interconnections are required to operate over a distance range of ~1 mm to ~5 cm, and MCM-to-MCM interconnections are required to operate over a distance range of ~2 mm to ~2 cm.

The literature also describes [D. A. B. Miller and R. Athale, AT&T/ARPA CO-OP Hybrid SEED Workshop, (1995); D. A. B. Miller, Optics Lett., 14, 146 (1989)] the energy required to transmit one bit of information as a function of distance for optical and electrical transmission techniques. The most significant feature of this information is that the quantity of energy required to transfer one bit of information between a source and a detector is linearly dependent upon distance if the energy is transferred electrically, but is essentially independent of distance if the energy is transferred optically. This is because the capacitance of the transmission line between source and detector increases in direct proportion to its length, whereas optical transmission is essentially lossless over the distance range of the graph. Therefore, for distances in excess of some critical value, it becomes advantageous to use light to transfer information. In the graph, it is assumed that 1V electrical signals are used and that the capacitance of the electrical transmission line is ~50 pF/m. Three optical pulse energies: 600 fJ, 60 fJ, and 6 fJ are also plotted. For a 1 GHz repetition rate, these energies correspond to laser powers of, respectively 600 $\mu$W, 60 $\mu$W, and 6 $\mu$W. For the pulse energies considered the critical distance, above which it is energetically favorable to use light to transmit information, is, respectively, 7 mm, 700 $\mu$m, and 70 $\mu$m. For the assumptions of 1 V signals, optical energy ~6 fJ per bit, the critical distance is ~70 $\mu$m.

Figure 3:
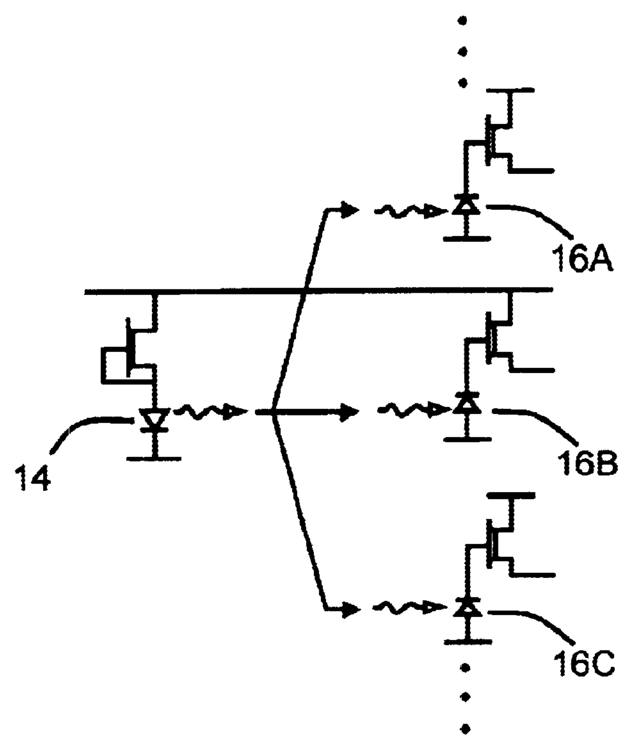
FIG. 3 illustrates a one-point-to-many points (fan-out) interconnect—one source coupled to many receivers for on chip clock distribution and die-to-die communications.

To implement efficiently the low power interconnects described above and shown in FIG. 3, it is necessary to integrate low power, low threshold lasers with Si CMOS circuitry. In the low power interconnect scenario, one light source 14 transmits many to many detectors 16A, 16B, 16C, and so on.

Sensitive receivers can be easily designed and fabricated. A GaAs E/D MESFET receiver with a sensitivity of better than −22 dBm for a bit error rate (BER) of $10^{-16}$ has been designed by assignee of the subject application.

Receivers of this sensitivity, which corresponds to an optical pulse energy of 6 fJ at 1 GHz, can readily be fabricated in Si CMOS. The signal-to-noise ratio (SNR) required to achieve a BER of $10^{-16}$ is approximately 16, but a 600 $\mu$W laser, typical of what may be efficiently achieved with gain-guided VCSELs, has a pulse energy of 600 fJ when operating at 1 GHz. For a point-to-point interconnect, 99% of the optical power (and 99% of the power used to drive the laser) would therefore be wasted. A more efficient implementation would use a laser with a much lower threshold.

The present invention proposes use of buried oxide VCSELs, which the opportunity to use low threshold lasers in this application. A 6 $\mu$W laser operating at a 1 GHz repetition rate would yield 6 fJ optical pulses, which would result in maximum efficiency for a point-to-point optical interconnect. Oxide-confined VCSELs with threshold currents <10 $\mu$A have been achieved.

Many-Points-to-One-Point (Fan-In)—Increased Algorithmic Flexibility

Figure 4A:
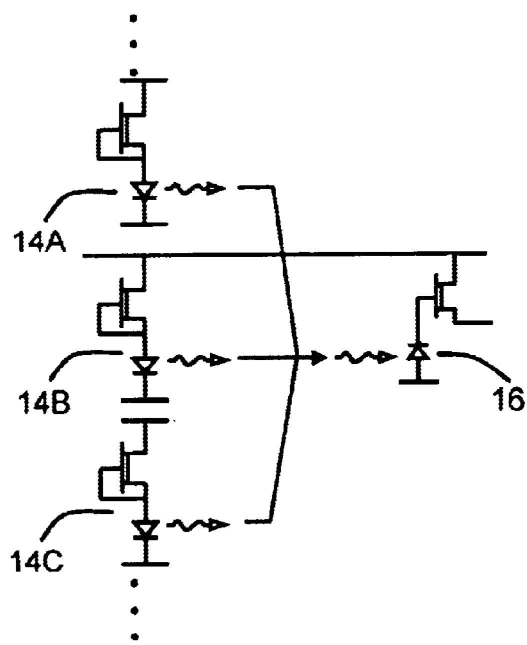
FIGS. 4A and 4B illustrate a many-points-to-one points (fan-out) interconnect—many sources couple to one receiver for die-to-die communications, and one resulting logical relationships that can be achieved.
Figure 4B:
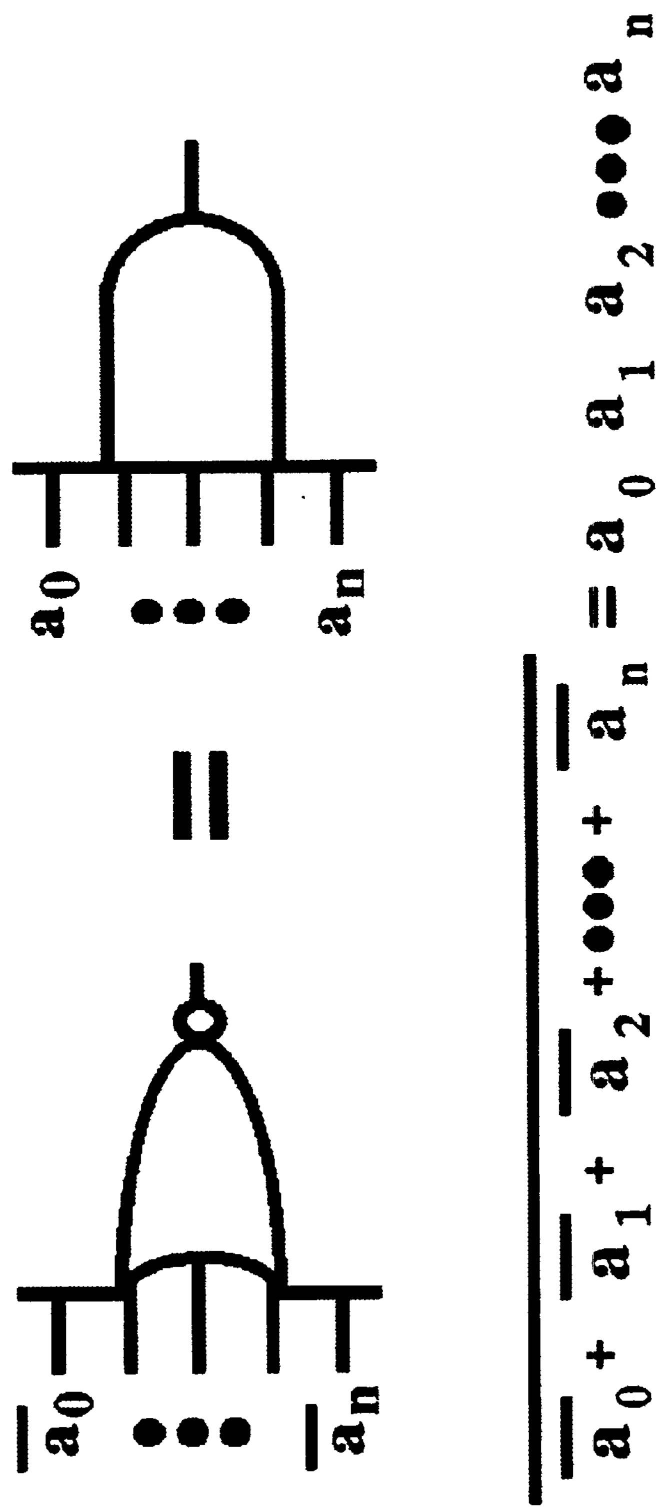

The use of optical interconnects also allows more flexibility in the design of logic circuits via the use of many-points-to-one-point (fan-in) interconnect scheme to achieve a "smart interconnect" logic function. In FIG. 4A, multiple light sources 14A, 14B, 14C, and so on, transmit to a single detector 16, with the resulting logical relationship illustrated in FIG. 4B. In this configuration, many sources couple to one receiver for die-to-die communications. DeMorgan's Law can be implemented to generate free space optoelectronic gates when dual rail logic is applied resulting in "smart interconnects."

Conventional CMOS logic gates consume energy and are slowed because of the capacitance of the input transistors (and also because of the capacitance of the input lines, as discussed previously). In a four-input Si-CMOS NOR gate, the gate has eight transistors—two for each input. As the number of inputs increases, so does the number of transistors. The parasitic capacitors associated with each of these transistors must be charged or discharged for the gate to change state. Energy consumption and speed considerations limit the number of input lines (fan-in) and the number of output lines (fan-out) to approximately five in a CMOS circuit [N. H. E. Weste and K. Eshraghian, Principles of CMOS VLSI Design, 2nd ed., Addison Wesley, Reading, Mass. (1994)]. The low fan-in and fan-out limit the types of algorithms that can be implemented efficiently in electronics.

Figure 5:
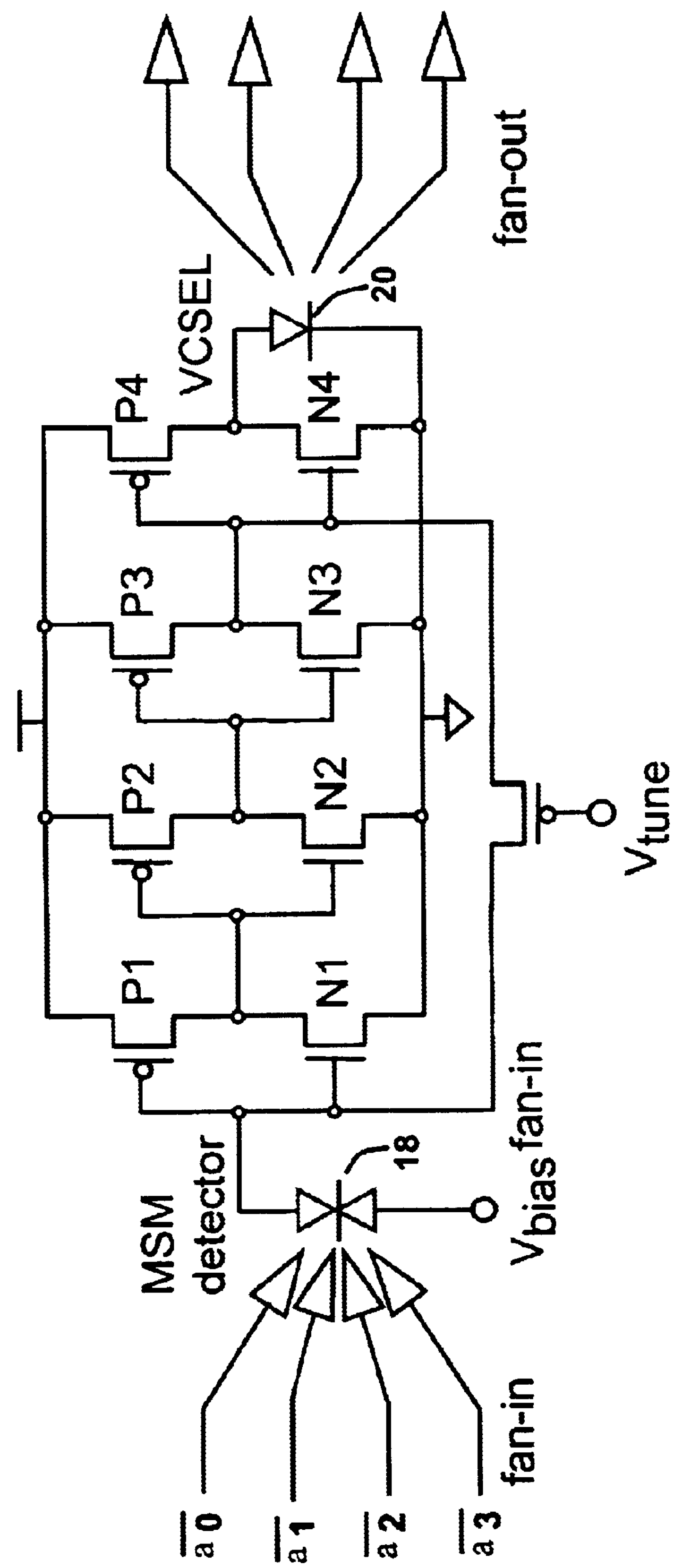
FIG. 5 illustrates an optoelectronic implementation of Si-CMOS NOR gate.interconnects.

A hypothetical optically interconnected Si-CMOS NOR gate is shown in FIG. 5. In this case, the parasitic capacitance (and hence the speed) of the circuit are independent of the number of inputs and outputs. The MSM detector can handle a wide range of fan-in without an increase in the Si-CMOS circuitry needed to process the output of the MSM detector 18; with a similar savings in Si-CMOS circuitry as the fan-out changes out of output light source 20.

Significantly higher fan-in's and fan-out's are possible with optoelectronic logic gates. We estimate that the maximum fan-in and fan-out will be determined by optical scattering and will be ~100 in each case. The large available fan-in and fan-out will permit the efficient implementation in optics of algorithms which are impractical to implement with electronics.

The availability of low threshold VCSELs would allow the fan-out of the optical sources to be tailored to the algorithm being implemented. Using a high power laser capable of high fan-outs in a low-fan-out application would require more energy per bit than necessary, which would increase the average energy consumption of the device. For example, a 600 $\mu$W laser and a receiver which had a sensitivity of better than −22 dBm would support a fan-out of 100. Few algorithms require such high fan-ins and fan-outs. The use of a lower power laser would allow the efficient implementation of algorithms which require a lower fan-out: a 60 $\mu$W laser would support a fan-out of 10.

Many-Points-to-Many-Points—HPOC Module

Figure 6B:
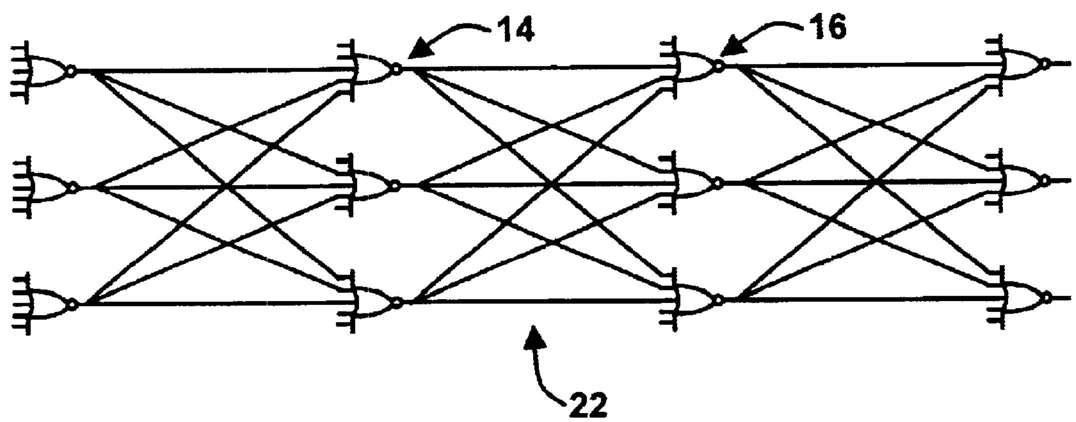
FIGS. 6A and 6B illustrate a many-points-to-many-points (fan-out) interconnect in which any source may be routed to any (or all) receivers for arbitrary digital functionality and cascadability (FIG. 6A), and which results in planes of interconnected NOR gates. DeMorgan's Law as applied to dual rail digital is implemented in 4D global freespace to achieve programmable digital photonic logic arrays (DPLA) (FIG. 6B).
Figure 6A:
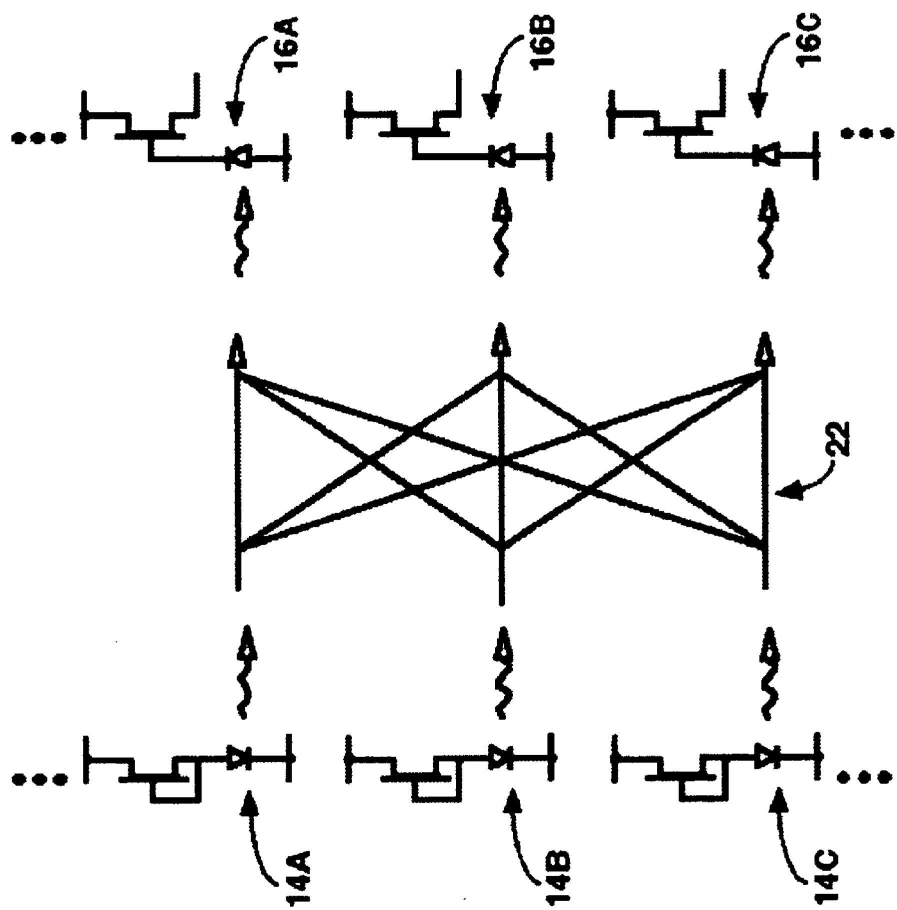

By combining wide fan-out and fan-in systems, a more general implementation, the HPOC module [P. S. Guilfoyle, F. F. Zeise, and R. V. Stone, Optical Enhancements to Computing Technology, J. Neff, Ed., Proc. SPIE 1563, p.267 (1991); P. S. Guilfoyle, F. F. Zeise, and J. M. Hessenbruch, in Optical Computing Technical Digest, p. 78 Optical Society of America, Washington, DC (1993)] configured for digital photonic logic arrays (DPLAs), may be obtained. The high performance optoelectronic communications ("HPOC") module is an optoelectronic integrated circuit which comprises an array of 850 nm VCSELs, laser drivers, diffractive optical interconnect elements (DOIEs), photodetectors, and optical receivers. As shown in FIGS. 6A and 6B, a complete interconnect network is achieved. Multiple light sources, 14A, 14B, 14C and so on, transmit to multiple detectors 16A, 16B, 16C, and so on. The incorporation of diffractive optical interconnect element (DOIE) technology 22 allows programmability of any given interconnect. Arbitrary DPLA functionality is thus obtained. FIG. 6B illustrates the logical relationship of the physical interconnect structure of FIG. 6A.

The incorporation of lasers and photodetectors with Si CMOS circuitry ultimately allows the higher levels of integration coupled with substantially lower power consumption, while enjoying increased free space interconnect density. The device technology permits a more optimal implementation of the HPOC module than is possible with current technology, where the VCSELs and smart pixels are on separate die.

Figure 7:
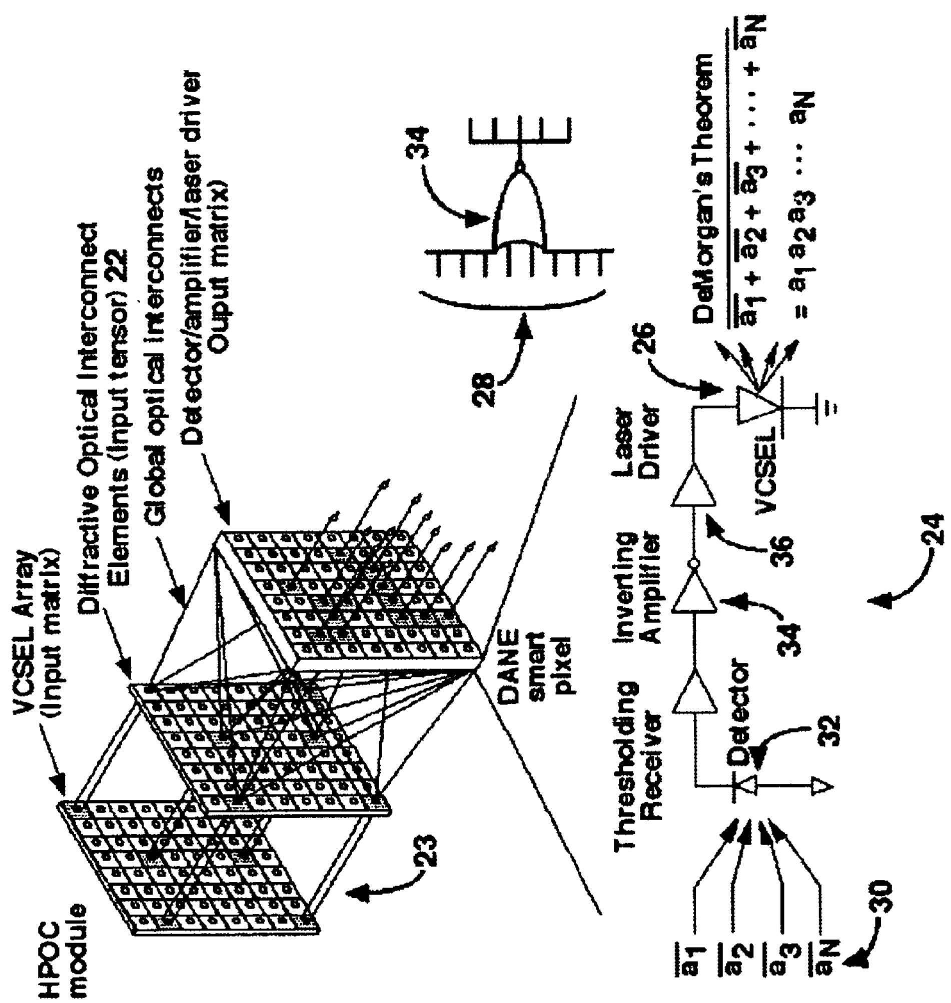
FIG. 7 illustrates a high performance optoelectronic communications (HPOC) module showing a single-channel DANE smart pixel that is the equivalent of a wide fan-in NOR gate.

The simple single stage configuration of the HPOC module 23 is shown schematically in FIG. 7 where module comprises a DANE 24 cell which detects the signal, amplifies the result, negates (or inverts) the data, and then emits the output function through the VCSEL 26. The bits of a wide digital word (up to a maximum width N of approximately 100 bits) 28 are represented in complementary notation by a set of optical beams 30 that converge onto a thresholding detector 32. Due to the threshold and logical inversion, each cell performs a NOR function 34 on the incoming bits, as shown in FIG. 7. From DeMorgan's theorem, this is equivalent to the Boolean AND of the original data bits. Thus, the DANE cell 24 is a smart pixel because, depending on the representation of the data, it computes an N-input NOR or AND logical operation via free-space optical interconnects.

Additional functionality may be obtained by including a digital section between the amplifier 34 and the laser driver 36.

By using the DANE cells 24 to generate many specific (user programmed) minterms, complete switching systems may also be realized. The planar DOIEs 22 can store fixed "programs" or "instruction sets" to effectively function as the system ROM.

With a constant clock speed and a fixed array, size, the number of interconnections an optoelectronic device can implement is an approximate measure of its raw computing power. In the HPOC module 23, this is abut $N^4$, where the HPOC module 23 contains N×N VCSEL arrays, each of which can be connected with up to $N^2$ detectors. As a complete device, the HPOC module performs a matrix-tensor Boolean multiplication. We have designed it so that several modules may be easily cascaded: the output lasers of one DANE cell serve as the inputs of the next HPOC module. In a two-stage cascade, we can configure the DOIE interconnects 32 in each HPOC module 23 so that the first module generates minterms and the second sums them. A cascade of these devices can thus execute complete instruction sets.

Figure 8:
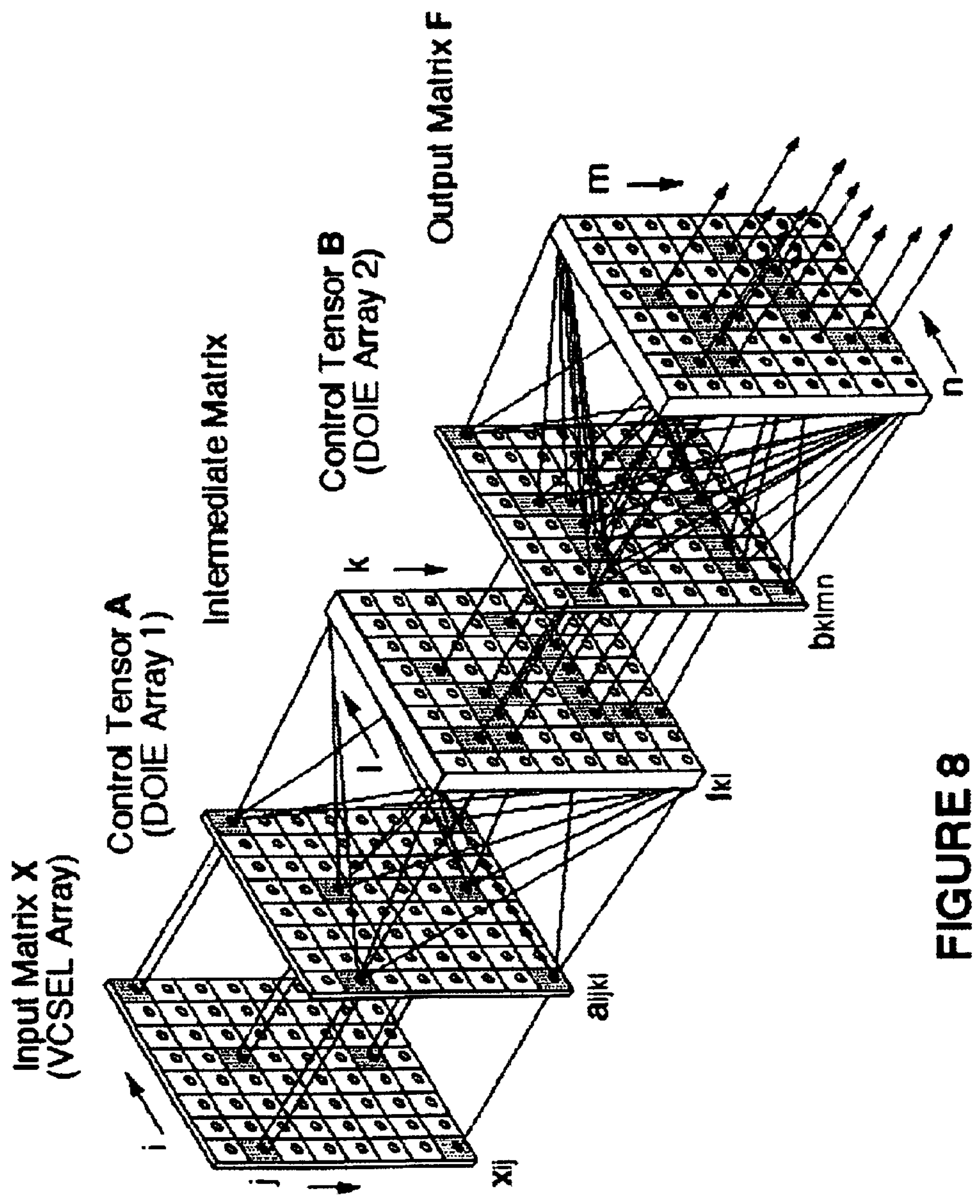
FIG. 8 illustrates a two-stage HPOC module cascade.

A two-stage cascade of HPOC modules is shown in FIG. 8. Current GaAs-based HPOC modules comprises 8×8 arrays of vertical-cavity surface-emitting lasers (VCSELs); 8×8 arrays of computer generated holograms (DOIEs); and 8×8 detector/receiver arrays. Light from one VCSEL is incident on each DOIE, which routes the light to a set of detectors determined by the structure of the DOIE. Depending on the DOIE structure, light from each VCSEL may be routed to one or many detectors. If the VCSELs are sufficiently powerful, many detectors can be illuminated with enough photons to bring the receiver above threshold. Each receiver inverts and has a threshold at an optical power corresponding to ~½ bit. Each receiver, therefore, performs the NOR function.

The maximum fan-out is limited by scattered light; it is estimated that a fan-out of up to ~100 may be achieved. As discussed previously, the capacitance of the receiver is unaffected by the number of light beams incident on the detector; therefore, fan-ins of up to ~100 may be obtained.

As described above, the HPOC module architecture can be used to perform Boolean matrix-tensor multiplications. The HPOC module depicted in FIG. 8 performs the calculation F=A▯X, where $X=(x_{ij})$; i=1, 2, . . . 1, j=1, 2, . . . J is the input matrix; $F=(f_{kl})$; k=1, 2, . . . K, I=1, 2, . . . L is the output matrix; and $A=(a_{ijkl})$ is the control tensor. F, A, and X contain all-Boolean quantities. The data matrix is represented by the on-off states of the VCSEL array. The control tensor, A, which contains the microcode for the instructions to be executed, is represented by the connection pattern encoded in the DOIE array. The nonlinear response function of the receiver causes the Boolean summation of the optical inputs to be performed, therefore the output matrix, F, represented on the detector array is given by:

$$f_{kl}=\prod_{i=1}^{I}\prod_{j=1}^{J}\overline{a_{ijkl}x_{ij}}=\overline{\sum_{i=1}^{I}\sum_{j=1}^{J}a_{ijkl}x_{ij}} \tag{1}$$

The output matrix, F, contains K×L terms. K and L are arbitrary and depend on the number of available detectors, and on the complexity of the instruction being executed.

The matrix-tensor multiplier can be used to execute instructions. If the bits of the input data word are stored in the input matrix, i.e., represented by the states of the lasers in the VCSEL array, a single pass through the system depicted in FIG. 8 can yield any of the minterms corresponding to bits of the input data word. The set of minterms calculated is determined by the tensor A, i.e., by the pattern of interconnects contained in the elements of the DOIE array. A second pass through the system would allow the minterms to be summed to form partial or complete instructions. An example of this is shown in FIG. 8, in which two HPOC modules are cascaded. The second HPOC module performs the double summation of the minterms computed in the first HPOC module.

The output $Y=(y_{mn})$, of the second HPOC module represents complete or partial instructions depending on the length of the instruction encoded into the diffractive optical elements in each HPOC. The two-stage cascade performs a Boolean matrix-tensor multiply, followed by a Boolean matrix-tensor addition:

$$y_{mn}=\sum_{k=1}^{K}\sum_{l=1}^{L}\left\{\prod_{i=1}^{I}\prod_{j=1}^{J}\overline{a_{ijkl}x_{ij}}\right\}b_{klmn}$$

where $B=(b_{klmn})$ is the control tensor of the second HPOC module. The two-stage cascade is required to fulfill the sum-of products formulation as required by Shannon's generalized digital computation theory [J. J. Morikuni and S. M. Kang, J. Ligthwave Technol., 10, 1426 (1992)]. A cascade of more than two HPOC modules which is required in, for example, switch networks, is also possible.

Virtual Optoelectronic Crossbar Switch

The assignee of the subject application has developed a virtual optoelectronic crossbar switch which employs smart pixel technology in conjunction with a resonant cavity enhanced (RCE) waveguide grating coupler (WGC).

Unlike the previously designed non-blocking 4×4 crossbar switch for the HPOC modules which used DOIEs for the optical interconnects, the virtual crossbar switch in accordance with the present invention utilizes fiber optic interconnects to implement the switching function [P. S. Guilfoyle, et al., "Free-Space Interconnects for High-Performance Optoelectronic Switching, IEEE Computer, Special Issue on Optical Computing, February, 1998 (Invited)]. The waveguide technology provides the enabling mechanism to achieve a zero latency, fully non-blocking, crossconnect switch. The virtual crossbar switching system is unique from architecture to component implementation. It is also applicable to long haul as well as premises area networks.

With a virtual optoelectronic crossbar system, the address decode function between processors is divided, leaving only the true distance interconnect implemented by optical means. This allows the entire system to be far more efficient by eliminating the central switches and servers, which provides backbone speeds to all users accessing the network. Therefore, latency is totally eliminated. The system is also clock rate reconfigurable. Switching may be performed at speeds within a clock cycle. Setup time is limited by the distance of the ethernet system. However, centralized optoelectronic crossbars utilizing switching technologies such as liquid crystal technology or a micro electro-mechanical system (MEMS) are limited to several micro seconds to millisecond switching times.

Architectural Overview

Figure 9:
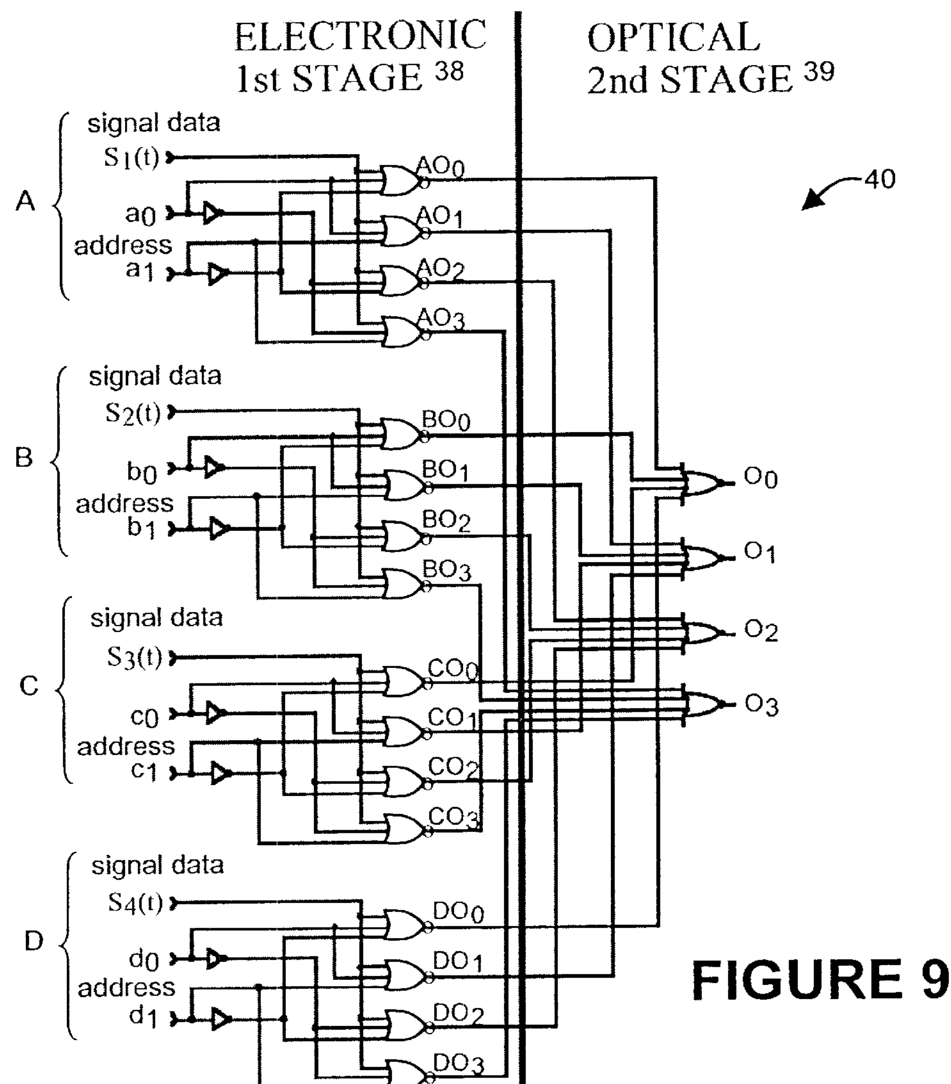
FIG. 9 illustrates a 4×4 crossbar switch and truth tables for the first (electronic) and second (optical) stages.

In FIG. 9, a 4×4 virtual optoelectronic crossbar switch 40 and truth table are shown. It shows how data can be transferred within an optical fabric with destination addressing for each signal architecture. This is a fully functional crossbar switch in that it can handle four input data channels and four output data channels simultaneously. The output contention is resolved in the control processor prior to sending the packet into the crossbar. The electronic logic circuit 38 has four input ports (A, B, C, D), each with signal inputs ($S_1$, $S_2$, $S_3$ and $S_4$) and a 2-bit destination address input. The 2-bit address is represented as a dual-rail address (both high and low true signal representations of each input address bit).

When a first stage NOR gate receives its address, it receives two zero valued address lines and the data signal. The output of the first stage NOR gate is then either a constant "0" (if not selected), or the inverted input signal. In FIG. 9, this would correspond to $AO_1$ for address $a_0a_1=00$, with an output of signal $S_1(t)$. In the second stage, the outputs for each destination address ($AO_n$ through $DO_n$) are again "NORed" together to generate only the signals specifying a particular address. Duplicate signal addresses are not generated since the addressing is supplied globally by the network controller.

Figure 10:
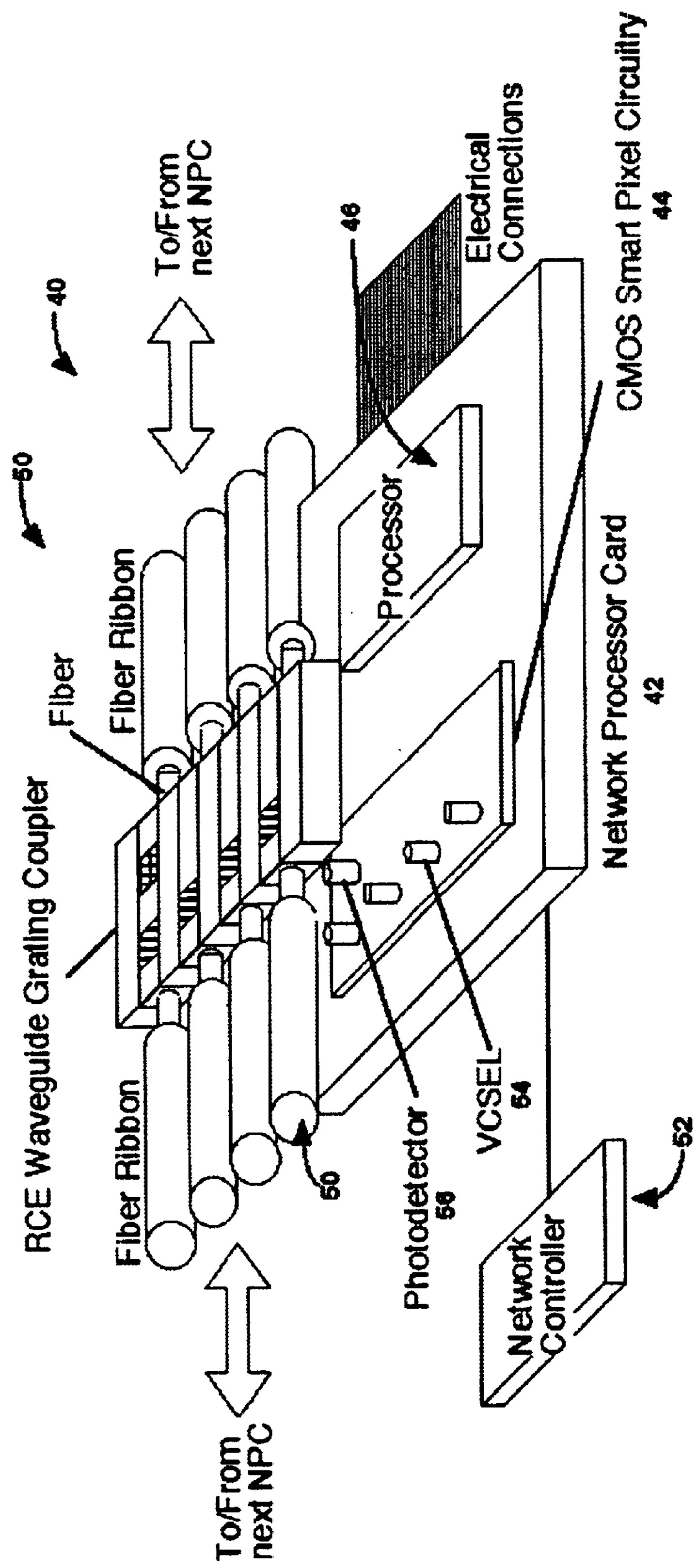
FIG. 10 is a more detailed view of a virtual crossbar for a single network processor card, in which collimating lenses and cylindrical lenses have been omitted for simplicity.

FIG. 10 shows a hardware implementation of the virtual optoelectronic crossbar switch 40. For simplicity, only one network processor node within the virtual crossbar is illustrated. For the 4×4 crossbar switch, four network processor nodes are required. The waveguide technology is utilized to achieve a zero latency, fully transparent network and excellent coupling efficiency. The system architecture is not readily implemented using linear arrays of edge emitting lasers due to their extremely high costs and difficulties during device integration of two dimensional (2D) components. Instead, it is implemented using 2D arrays of VCSELs and RCE photodetectors which are integrated directly onto CMOS circuitry to form a smart pixel array.

In FIG. 10, the network processor node comprises a network processor card 42 (NPC) which contains a smart chip 44, a processor 46, RCE WGCs 48, and fiber ribbons 50. The NPC 42 is connected to a network controller 52 which controls data traffic. (Collimating lenses and cylindrical lenses have been omitted for simplicity.)

A smart chip 44 contains complementary metal oxide semiconductor (CMOS) circuitry, VCSELs 54, and photodetectors 56. These components have been previously developed by the Assignee of the subject application for integration into smart pixel HPOC modules. VCSELs and photodetectors will be flip chip bonded onto the CMOS circuitry. The CMOS in the smart chip can be divided into three sections: the logic section, the laser driver, and the analog receiver. The logic section includes the NOR circuitry required to perform the first stage of the crossbar switch. The output of the logic section is connected to the laser drivers which powers the VCSELs to transfer the data optically. After traveling through the fiber and into the detector, the light is converted to photocurrent and sent to the analog receiver. The analog receiver then translates the data to digital logic levels and transfers the result to the processor chip.

A primary element of the virtual crossbar 40 is the optical coupling into and out of the fiber bundle 50. The virtual crossbar uses a unique resonant cavity enhanced waveguide grating coupler 48, which can theoretically couple up to ~99% of the light. Using the external waveguide 48, light is coupled from the fiber into the photodetector 56. Additionally, the waveguide 48 couples the light from the VCSELs 54 into the fibers 50. Collimating microlenses and cylindrical lenses are used to improve the coupling into the waveguide; however, they are not depicted in FIG. 10. Each VCSEL 54 is assigned to a specific fiber with N lasers for N processor nodes. Therefore, if the network has four NPCs 42 (for a 4×4 crossbar switch), then a parallel ribbon cable comprising four fibers is needed (this requirement can be relaxed in the wavelength division multiplexing (WDM) crossbar which will in a following section).

As shown in FIG. 9, the virtual optoelectronic crossbar 40 is divided into two stages: an electronic 38 and an optical stage 39. The first stage 38 of the switch will be implemented electronically by the CMOS circuitry; the VCSELs will optically transmit the result to the waveguide. In the second stage 39, the optical fiber 50 will transfer the data to the output waveguide coupler 48 where the data will be received by the photodetector 56 on the smart pixel chip 44.

Stage I: Electronic Implementation

The first stage of the 4×4 crossbar switch is implemented on the individual smart chips which contains CMOS circuitry, VCSELs, and photodetectors. Ion implanted VCSELs which operate at 850 nm have a threshold current between 4–8 mA for an aperture size of ~10 $\mu$m. For lower threshold currents (~1 mA), oxide-confined VCSELs may be used. The photodetector structure is a p-i-n AlGaAs/GaAs device with a Fabry-Perot resonant cavity. This RCE device efficiently absorbs most light at 850 nm. The fabrication process of the VCSELs and photodetectors enables them to be flip-chip bonded onto CMOS.

The CMOS design includes VCSEL drivers, the CMOS logic circuitry, and analog receivers for the detectors. The digital logic circuitry contains four NORs per chip to produce the first stage output. Each of the signals is connected to a 3-input NOR. As shown in FIG. 9, it is apparent that regardless of the combinations of $a_0$ and $a_1$, logically there will only be one NOR gate which outputs the signal in the first stage 38. This output will then be transferred to a laser driver and subsequently emitted from the VCSEL.

The Assignee of the subject application has been developing a transimpedance amplifier for 0.5 $\mu$m MOSIS fabrication. This amplifier will operate in the GHz range on a 3.3 V supply. The design will consume <5 mW of power. This transimpedance amplifier has the appropriate performance specifications for implementation into the smart chip design for the virtual optoelectronic crossbar switch.

The smart chip 44 fabricated using a linear array of smart pixels. Four smart pixels will be used on each chip where one smart pixel will be a dedicated detector for data input. The other three smart pixels will be used as dedicated VCSELs for data transmission.

Figures 11A, 11B:
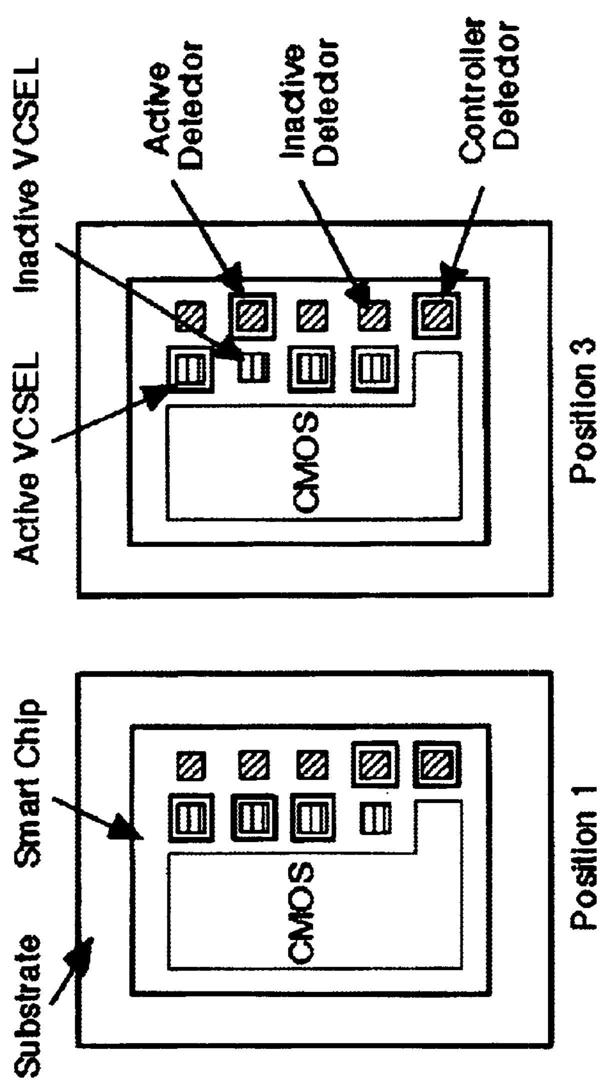
FIGS. 11A and 11B provide a top view of smart chips for positions 1 and 3.

FIGS. 11A and 11B shows two smart pixels for chip positions one and three in a 4 ×4 crossbar. The dedicated VCSELs and detectors are noted on each chip. The remaining VCSELs and detectors are inactive. Each chip requires only three active VCSELs for three interconnections in a 4×4 crossbar array. The fourth interconnection which does not require VCSEL emission is the on-chip case. In this instance, there is no need to transmit the signal because on-chip data communications are transferred electronically. A single smart pixel design for all chips has the following advantages: it occupies minimal real estate, it provides for changing waveguide patterns, and it allows for high density crossbars.

Stage II: Optical Implementation

After data has been transmitted from the VCSEL, the crossbar becomes optical. Light from the VCSEL is coupled by the surface-normal grating coupler above the laser. The light is then directed down the fiber until it reaches a surface-normal grating coupler. At this point, the light exits the fiber and illuminates the photodetector opposite the grating coupler. Since the routing from chip-to-chip is processor controlled, only a single VCSEL will illuminate a single fiber which means that the crossbar is fully non-blocking This is demonstrated in the truth table for the second (optical) stage of the switch (FIG. 9).

Figure 12:
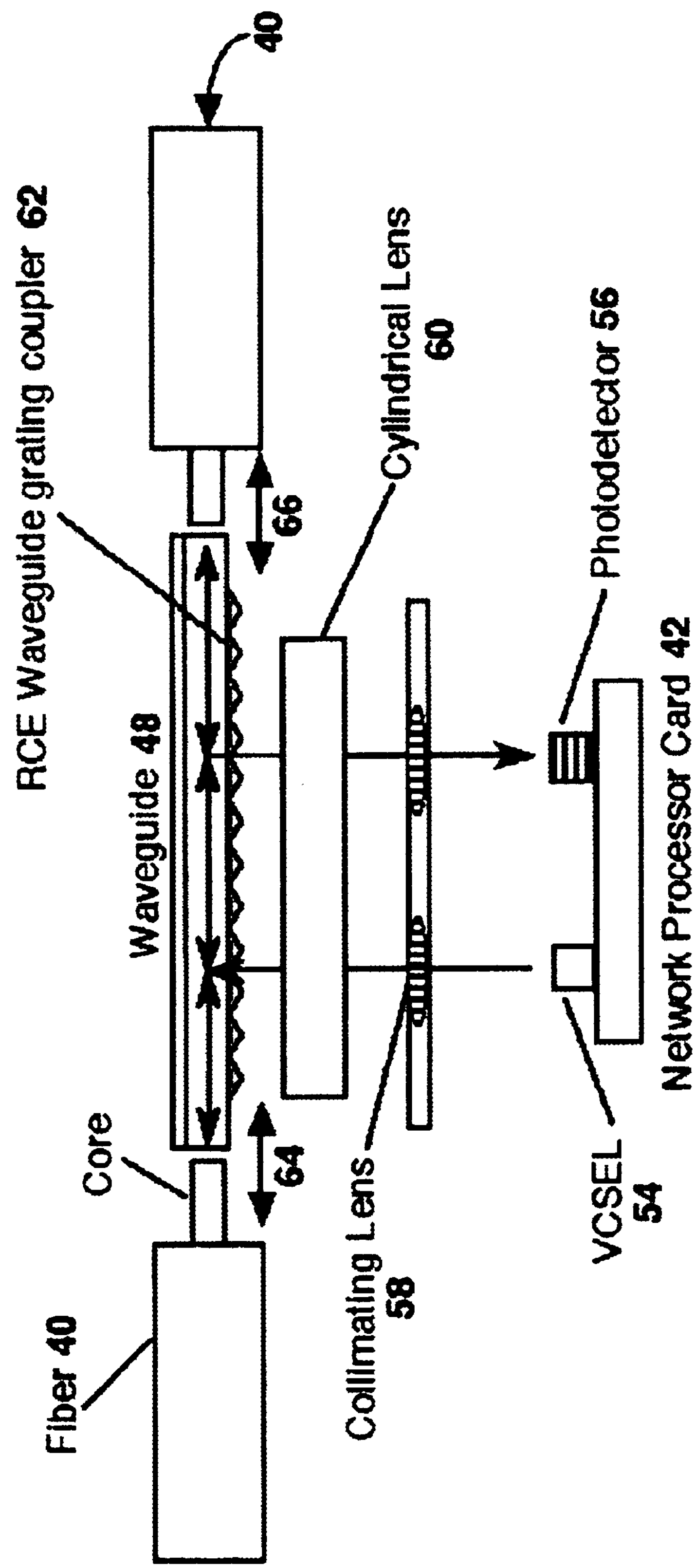
FIG. 12 illustrates a waveguide cross-section for an optoelectronic network processor card.

A cross-section of an individual waveguide is shown in FIG. 12. Collimating lens arrays 58 and a cylindrical lens 60 are used to capture the light more efficiently and direct it into the waveguide 48. The waveguide 48 contains bi-directional, waveguide grating couplers 62. The grating couplers 62 split the light into two horizontal paths, 64 and 66, one for each fiber connector. The fiber ribbons 40 are attached to the virtual crossbar using multi-channel fiber connectors (not shown for simplicity).

Research groups at IBM, Minnesota Mining and Manufacturing (3M), Hewlett Packard, and others have been developing fiber array connectors such as the Jitney and POLO adapters [J. D. Crow, et al., Electronic Components and Technology Conference, pp. 292–300, 1996; C. DeCusatis, et al., Handbook of Fiber Optic Data Communication: Intramachine Communications, pp. 331–384, (1998)].

The design of the grating coupler locations can be determined after the VCSEL and photodetector locations on the smart chips and the chip-to-chip spacing have been identified. The grating couplers 62 must be fabricated in the appropriate positions to align with the active VCSELs 54 and photodetectors 56 on the smart chips 44. Every smart chip will contain a photodetector coupler dedicated to the controller to receive address instructions. In addition to the dedicated photodetector coupler, the 4×4 crossbar requires one photodetector coupler and three VCSEL couplers to correspond to the active devices per chip. This design can be scaled to make larger switches. In the case of an N×N crossbar, each chip will need a photodetector coupler for control and a photodetector coupler for data transfer. For the transmit couplers, each chip will have N−1 VCSEL couplers.

In summary, with a 4×4 virtual optoelectronic crossbar system, the address decode function is divided between processors and performed electronically. The addressing occurs at high speeds using local circuitry. This efficient architecture leaves only the true interconnect distance implemented by optical means. Thus, the virtual crossbar combines the speed of on-chip electronics with the speed of optical interconnects in order to produce an advanced network architecture.

This is compared to conventional optoelectronic crossbars. Conventional optoelectronic crossbars require a central switching apparatus (switching box) and implement the address decode optically.

For example, a MEMS crossbar switch will process the first stage of the crossbar by activating micro mirrors and illuminating them in order to implement the addressing [R.

Pease, Lightwave, pp. 36, 38, 40, May, 1999]. Other switches optically transmit data to an electronic crossbar which has a slow activation time, a small number of channels, and difficult alignment [A. Krishnamoorthy, et al., IEEE J. of Select. Topics in Quantum Mechanics, Vol. 5, No. 4, pp. 41–42,April, 1999].

Virtual Crossbar System Architecture

A virtual optoelectronic crossbar system architecture may be implemented at varying degrees of complexity which provides enhanced network switching. This system incorporates a parallel ($N^2$), enhanced parallel ($N^3$), and global ($N^4$) architecture for fiber networks rather than using a standard point-point ($N^0$) interconnect scheme.

Premesis Networks—N 2 Fiber Crossbar with Network Controller

Figure 13:
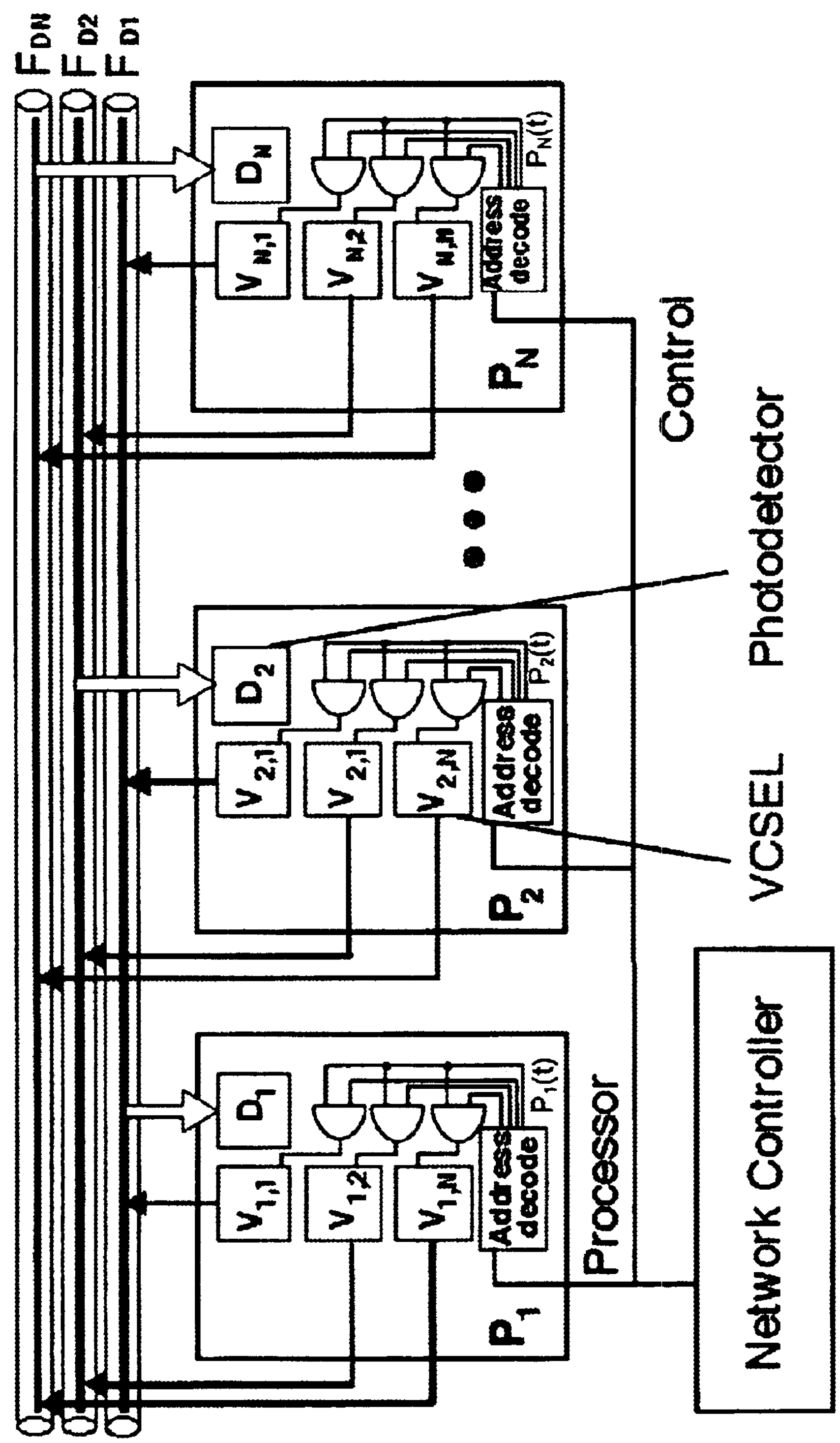
FIG. 13 illustrates the simplest form of the virtual optoelectronic crossbar in accordance with the present invention—N processors connected with N fibers, each processor's detector is assigned to an independent fiber, and a network controller is also provided.

The simplest implementation for the virtual optoelectronic crossbar architecture comprises an array of distributed processing nodes, labeled $P_1$ to $P_N$ across the network (FIG. 13). These nodes may be independent computers such as PCs, cards on a backplane, or die on a multi-chip module. The processor nodes are connected together with a parallel fiber ribbon cable. In addition to parallel fiber, a copper wire interconnects all of the processors. (Although fiber could be substituted for the copper wire, the bandwidth requirements do not make this implementation necessary.)

Figure 14:
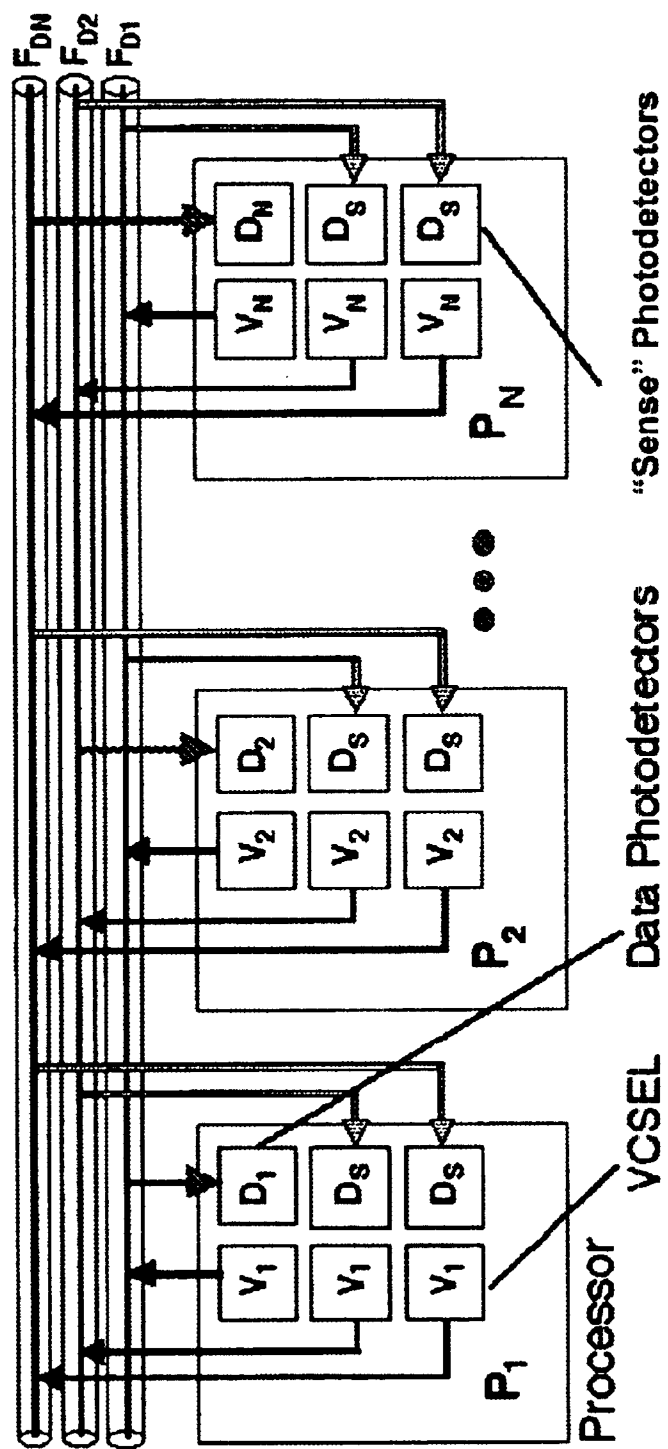
FIG. 14 illustrates an $N^3$ interconnect topology, in accordance with the present invention, including the addition of sense detectors to monitor all fibers in the system, and in which each processor may transmit autonomously when a fiber-to-processor channel is available.
Figure 15:
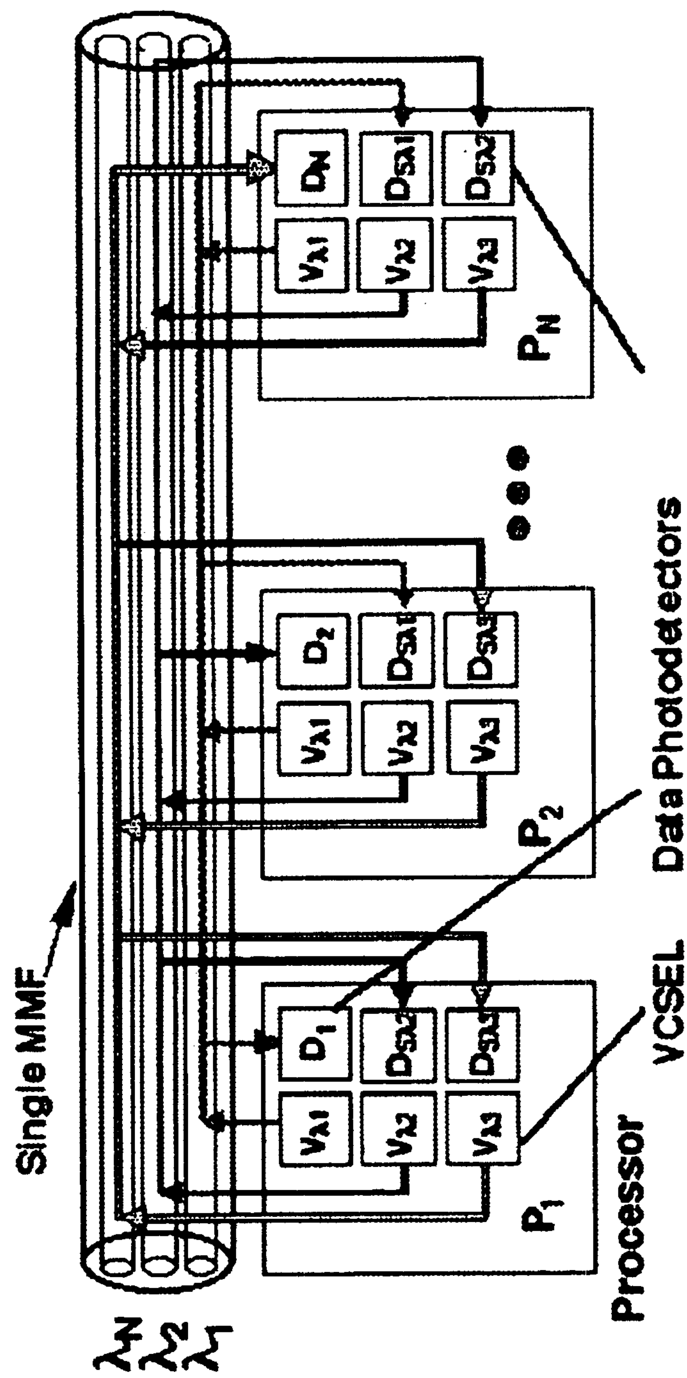
FIG. 15 illustrates how utilization of multiple wavelength VCSELs allows the parallel fiber array to be condensed into a single fiber.
Figure 16:
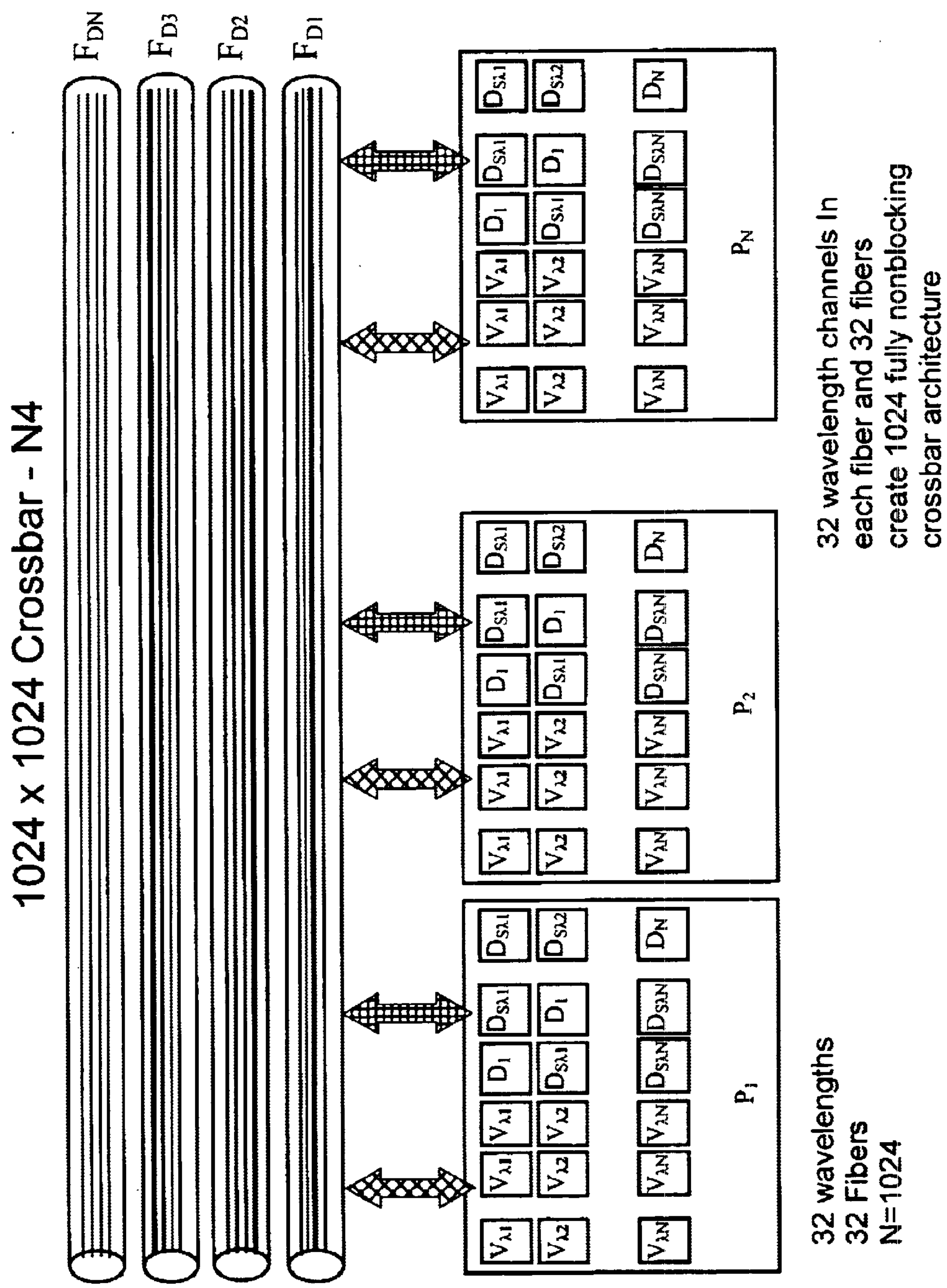
FIG. 16 shows how multiple WDM fiber channels can be configured in parallel to achieve higher density crossbars.

We refer to this architecture as an $N^2$ architecture, with N fibers interconnecting N processors. Specifically, each processor ($P_N$) contains a single photodetector ($D_N$) as well as an N-element array of VCSELs. Each photodetector is assigned to a specific fiber. Therefore, if the network has eight nodes, then a parallel ribbon cable comprising eight fibers is needed (this requirement is relaxed in subsequent $N^3$ and $N^4$ architectures as shown in FIGS. 14–16). The N element array of VCSELs has each element assigned to a specific fiber. In addition, a digital address decode block exists on the smart pixel. The network controller then specifies which VCSEL will emit to each fiber, which, in turn, goes to a specific processor.

In the $N^2$ embodiment of FIG. 13, only one VCSEL on a given smart pixel array is active or sending data at a given time. The transfer of data from that processor to the other selected processor goes through the assigned VCSEL, to the appropriate fiber, and to the photodetector assigned to that fiber. Multiplexing is essentially performed through independent fibers, for independent processors. The data is bi-directional in each fiber, a unique utilization for a fiber interconnect system. Therefore, data may be coming from either direction to a given photodetector. Most data links in other competitive systems, however, are not bi-directional. Consequently, each direction requires an independent fiber or multiple wave-lengths, or some other multiplexing scheme.

The virtual crossbar architecture would be impractical to implement with linear arrays of edge emitting lasers due to their extremely high costs. Thus, low cost monolithic arrays of VCSELs on CMOS arrays represent the enabling technology for this system architecture.

$N^3$ Fiber Crossbar with Network Controller Eliminated

The second generation architecture for the virtual optoelectronic crossbar would implement an $N^3$ interconnect topology, where the network controller may be eliminated which would make the crossbar truly distributed. To accomplish this objective, an array of sense detectors is added to each processing node as shown in FIG. 14 where N−1 sense photodetectors are added to the smart pixel array. (The reason for N−1 is that the Nth photodetector is designated as the "data receive photodetector" for that processor.) Each sense photodetector is assigned to a specific fiber; it is thereby assigned to listen to the data going to a specific processor. When the fiber is inactive, i.e. the sense photodetector does not detect any activity, it informs its host processor. If the host processor wishes to send data to the processor where the inactive fiber is assigned, it can transmit information. In such a fashion, a truly autonomous anarchy is established.

Each processor effectively listens to all channels waiting for them to become inactive. When the desired processor data channel becomes quiet, the processor sends its data to that channel. The system effectively implements an ethernet type protocol at the hardware level by implementing the protocol through a fully non-blocking crossbar.

$N^3$ interconnect topology permits the addition of sense detectors to monitor all fibers in the system. Each processor may transmit autonomously when a fiber-to-processor channel is available.

For the second generation architecture, the hardware requirements are satisfied through smart pixel technology. Independent arrays of VCSELs and arrays of RCE photodetectors hybrid flip-chip bonded onto CMOS drivers and receivers. Once again, the utilization of arrays of devices at each processor enables these types of architectures. The monitoring of each fiber channel at each processor location permits the elimination of the central controller. Each CMOS smart pixel is able to compute the status of the fiber bus and determine the activity on the bus.

$N^3$ Autonomous WDM Single Fiber Crossbar with Network Controller Eliminated

In the prior two implementations of FIGS. 13 and 14, all of the VCSELs were operated at the same wavelength (850 nm), although mutually incoherent, through multimode fiber. If each VCSEL were to be operated at a different wavelength, $\lambda_1$, $\lambda_2$, through $\lambda_N$ (i.e. wavelength division multiplex—WDM) then it should be possible to design a system where, instead of using a parallel array of fibers, only a single fiber would be required.

The third generation system architecture utilizes such a configuration, as shown in FIG. 15. Although multiple wavelength VCSELs are possible through multiple epitaxial steps, the technology for monolithic VCSEL arrays as well as tunable VCSELs for WDM is still being developed. In this architecture, coarse WDM VCSEL sources may be utilized. As shown in FIG. 15, each smart pixel array has N VCSELs of differing wavelength. All of the processing elements have the same VCSEL array. They are shown in the FIG. 15 as $V_{\lambda 1}$ through $V_{\lambda N}$. All of the VCSELs are transmitted through a single fiber. The wavelength separation is driven at a minimum by the bandwidth requirement of the data, but more so by the modal and repeatability requirements of each VCSEL to achieve a separation of >10 nm.

The detection elements are fabricated as RCE photodetectors. This provides the property of wavelength filtering. Filter bandwidths as low as 3 nm are readily achieved. Each photodetector is tuned to its corresponding VCSEL providing a natural narrow band filter without resorting to external means such as dielectric coatings, etc. The emission, detection, and filtering are fabricated into the monolithic structure.

The single fiber WDM autonomous virtual optoelectronic crossbar could conceivably have as many as 8 to 16 independent channels utilizing coarse WDM type wavelength spacing. Crossbars using 8×8 and 16×16 architectures may thus be built into a single fiber. Future enhancements may be envisioned where the wavelength spacings are narrowed or the channel packing densities are much higher.

$N^4$ Autonomous WDM Multiple Fiber Crossbar with Network Controller Eliminated

To achieve crossbars with densities in the thousands, a parallel array of fibers may be developed, each with its own set of WDM channels (FIG. 16). For example, 32 fibers each with 32 WDM channels could be configured into a 1024×1024 crossbar.

Figure 17:
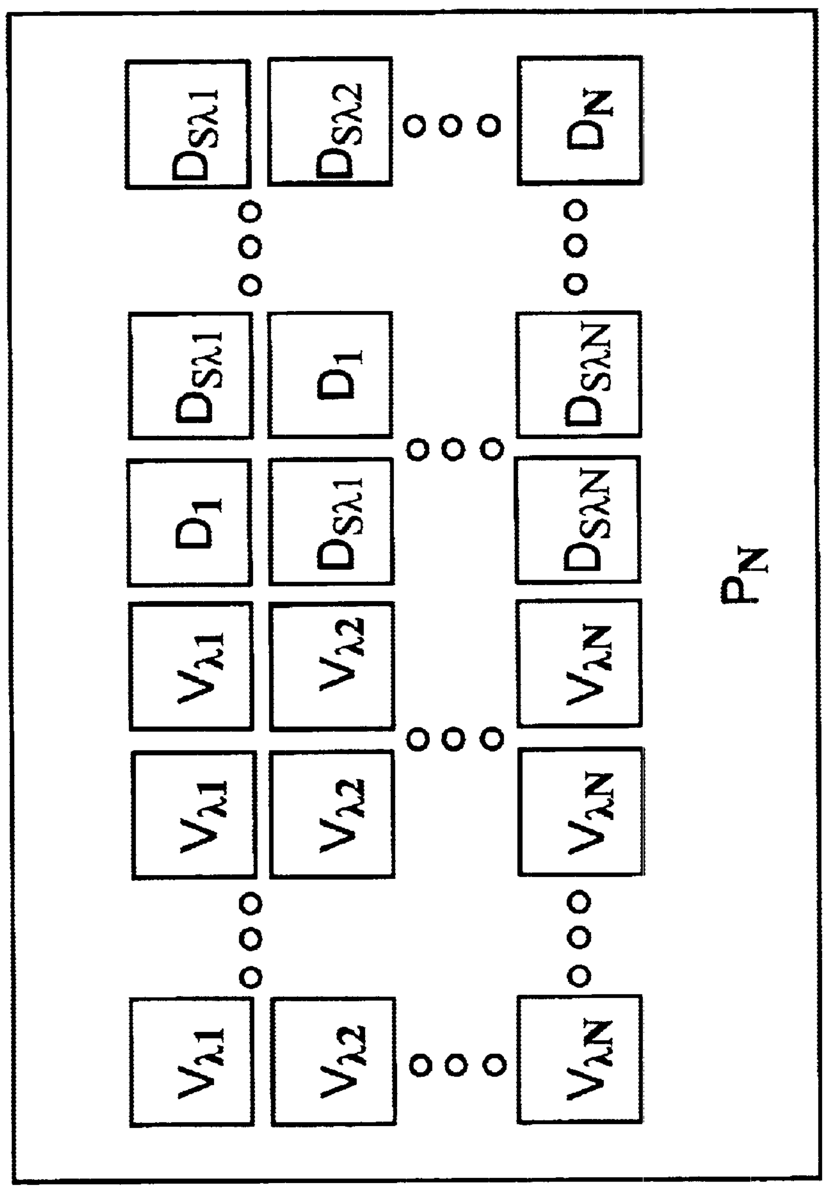
FIG. 17 is an expanded view of the requirements within a single smart pixel for the multichannel, multiwavelength crossbar as shown in FIGS. 6A and 6B.

Only N wavelengths are required for the VCSELs. This array of N wavelengths is then repeated as many times as there are parallel fibers (FIG. 17). This condition is identical for the photodetector array. Thus, the square root of the number of channels equals the number of fibers and wavelengths needed (for an equalized set). Other architectures need the full $N^2$ channels to achieve the same result.

Figure 18:
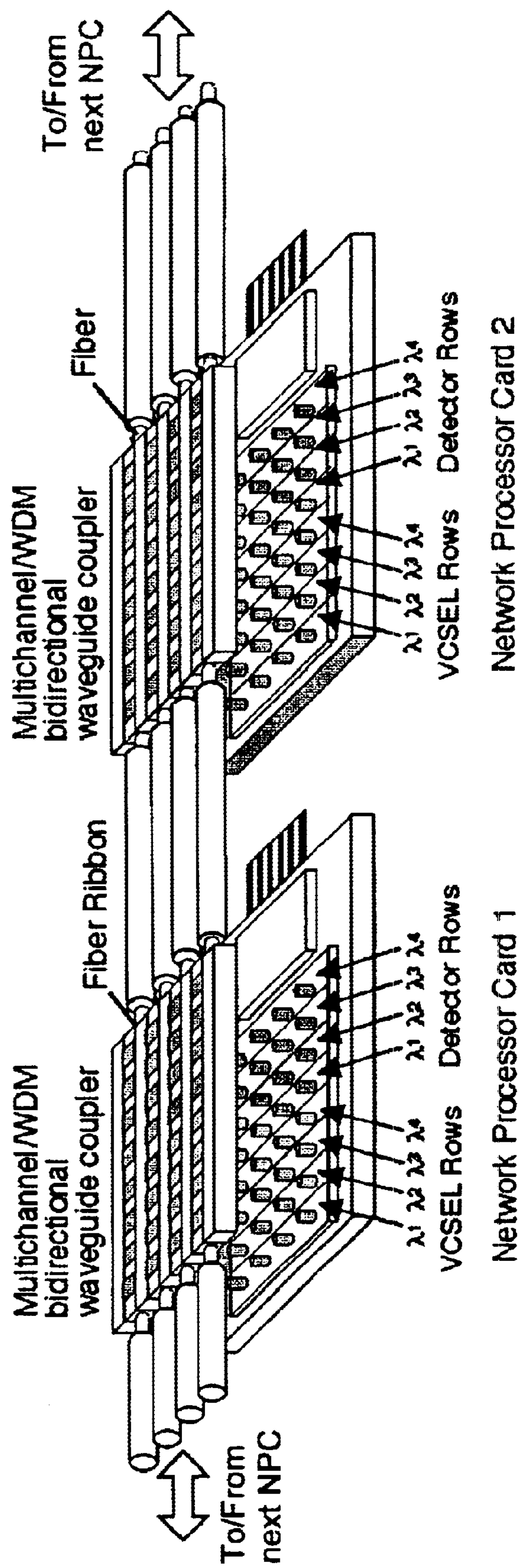
FIG. 18 is a representation of two nodes within a virtual crossbar in accordance with the present invention.

FIG. 18 shows a proposed hardware implementation of the global (N4) parallel WDM crossbar. Only two processing nodes are presented for simplicity. The network comprises a parallel array of N fibers. Each fiber is addressed by M VCSELs at different wavelengths (WDM). The total number of communication channels equals M×N (32 fibers×32 wave-lengths=1024 channels). Each channel is assigned an independent sense photodetector. VCSEL/Photodetector arrays are flip-chip bonded onto a monolithic CMOS driver/receiver smart pixel array.

This type of configuration is truly unique for smart pixel array technology where surface emitting technology is absolutely required, i.e. two dimensional arrays. Such smart pixel integration is again the enabling technology which makes this architecture possible. The $N^4$ autonomous WDM multiple fiber crossbar with the network controller eliminated is perceived as the fourth generation architecture for future implementation.

Optoelectronic Backplane

Figure 19:
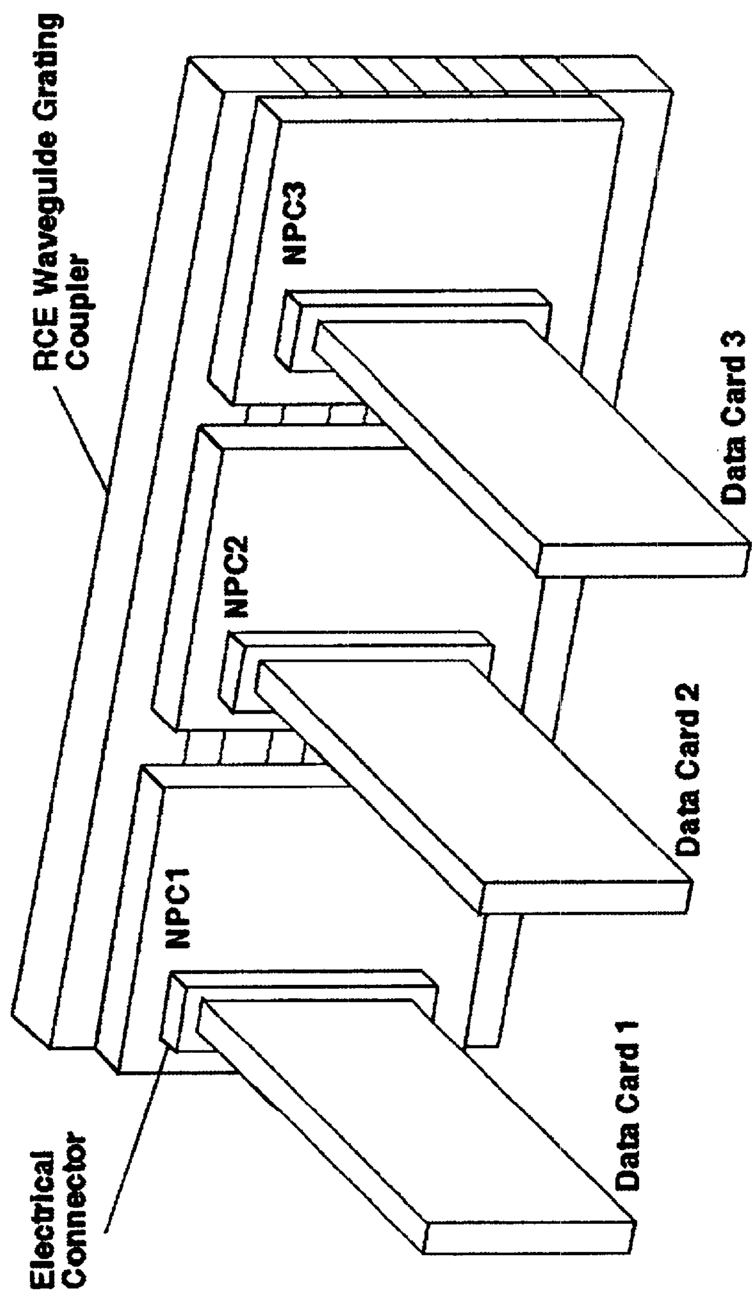
FIG. 19 is an overview of an optoelectronic backplane in accordance with the present invention.

The optoelectronic backplane can be implemented using a virtual crossbar. An overview of the backplane is shown in FIG. 19. As network switching becomes more complex and interconnect densities increase, the need for high throughput switching becomes apparent. Building on the foundation of chip-to-chip communications developed by the Assignee of the subject invention, a board-to-board optoelectronic backplane can be implemented using the virtual crossbar architecture for high throughput and high speed data transfer. Just as the crossbar is distributed over the LAN configuration, the optoelectronic backplane distributes the switching function across the boards.

Figure 20:
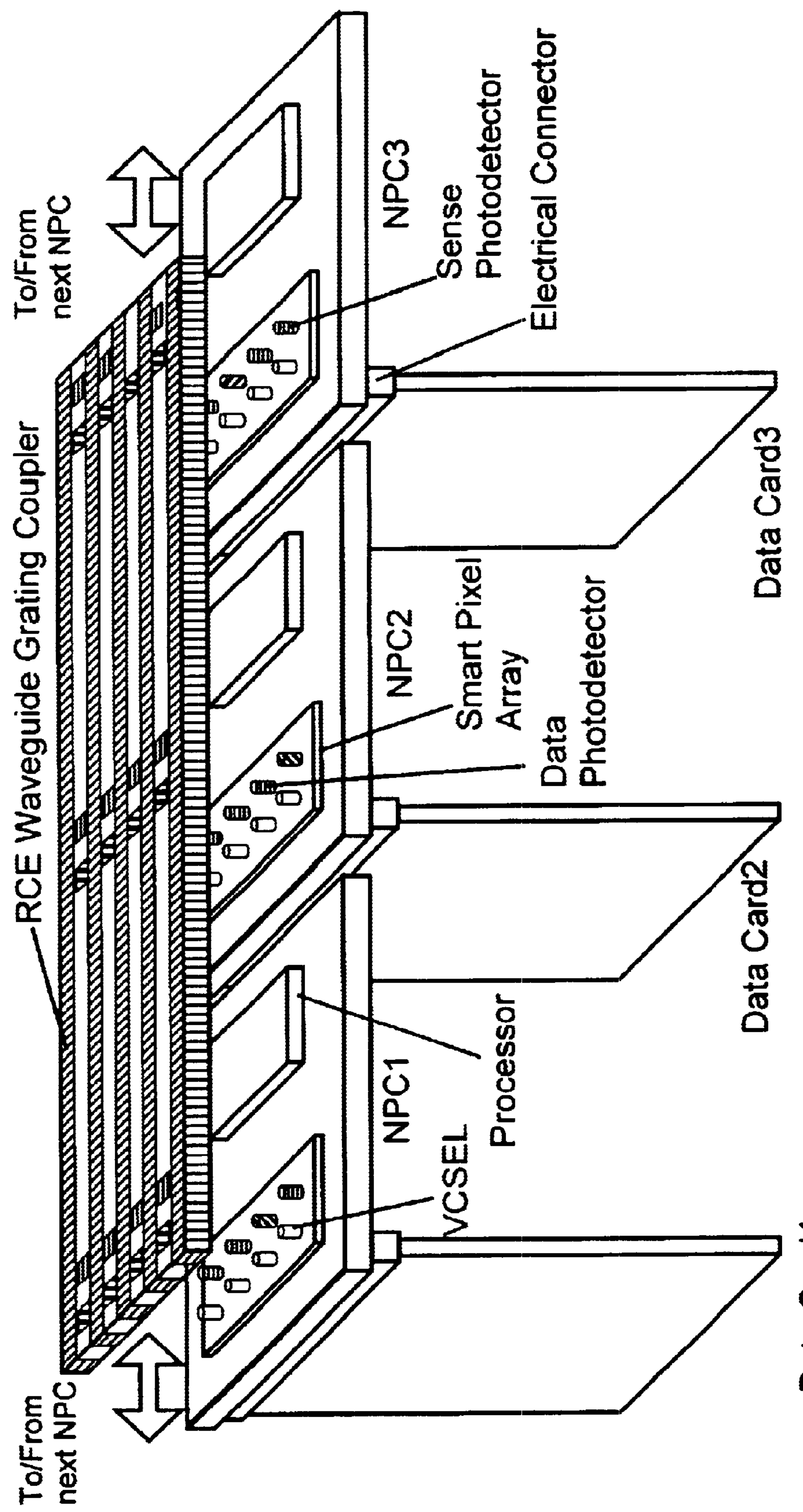
FIG. 20 shows a detailed view of the optoelectronic backplane for board level communications (rotated view from FIG. 19).

The detailed view of the optoelectronic backplane is shown in FIG. 20. The virtual crossbar for the backplane is implemented with a polysilicate glass optical waveguide which spans the width of the equipment rack. Each NPC contains VCSELs and photodetectors flip-chip bonded to smart pixels for transmitting/receiving data. The daughter or data cards are connected to the NPCs by an electrical board connector. Connections can be made from board-to-board (waveguide), row-to-row (fiber), or rack-to-rack (fiber). When WDM is employed, the scalability of the backplane is dramatically increased.

Enabling Technologies for the Virtual Crossbar Implementation

The critical technical barriers are focused on the waveguide coupler technology. These include increasing waveguide diffraction efficiency, operation in both single and multimode, and resonant cavity reflectivity within the coupler. The virtual crossbar uses a unique RCE waveguide grating coupler, which can theoretically couple up to 99% of the light. Using the external waveguide, light is coupled from the VCSELs into the fiber and from the fiber into the photodetectors. In addition to the WGC, other enabling technologies include cost effective VCSELs and RCE photodetectors integrated onto CMOS circuitry. Secondary critical areas include VCSEL coupling (buried, external, monolithic, and hybrid waveguide), hybrid and monolithic WDM VCSELs (coarse and fine grain WDM), monolithic-vs.-hybrid VCSEL/photodetector integration, and CMOS transimpedance amplifier/driver bandwidth.

Resonant Cavity Enhanced Waveguide Grating Coupler

Figure 21:
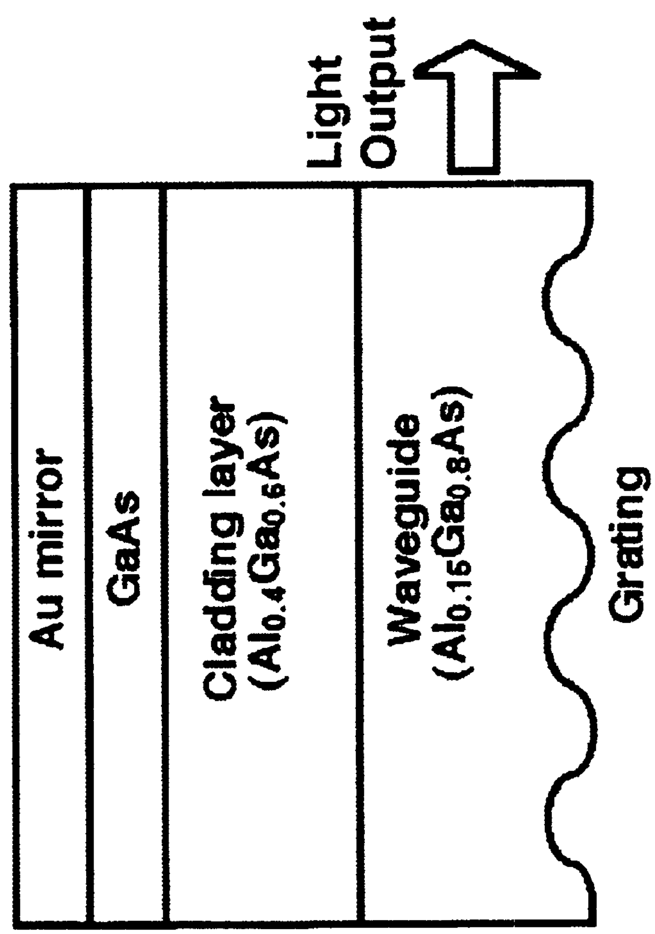
FIG. 21 is a diagram for an epitaxial waveguide.

A primary element of the virtual crossbar is the waveguide grating coupler (FIG. 21). The WGC is one of the unique components in the virtual crossbar because of its high efficient design. The resonant cavity enhanced WGC is utilized to couple almost all of the light from the VCSEL. Waveguide coupling is enhanced by employing superposition, where the reflection of the top VCSEL mirror combined with the reflection from the mirror on the waveguide causes the light to be continually directed back into the waveguide. The waveguide grating coupler then redirects this vertical light horizontally into the waveguide. Depending on the diffraction efficiency, a theoretical coupling of 99% can be achieved.

The waveguide can implemented using an epitaxially grown substrate.

A comprehensive design simulation has been performed to optimize the waveguide epitaxy in order to improve the performance of the structure during operation. As shown in FIG. 21, a prototype design has been developed which comprises a GaAs substrate with a 2.25 $\mu$m thick cladding layer and a 0.5 $\mu$m waveguide core layer. The total thickness of the structure including the substrate will be ~500 $\mu$m. The two waveguide epitaxial wafers will be grown using molecular beam epitaxy (MBE). After epitaxial growth, a grating coupler will be developed on the surface of the waveguide in photoresist. Then by reactive ion etching (RIE), the grating pattern will be transferred to the epitaxy. In order to increase the reflectivity of the back of the waveguide ($R_2$), the GaAs substrate will be removed using a wet chemical etch. The mirror will be deposited by evaporating a gold layer on the back of the waveguide. Channels will be patterned on the waveguide.

Figure 22:
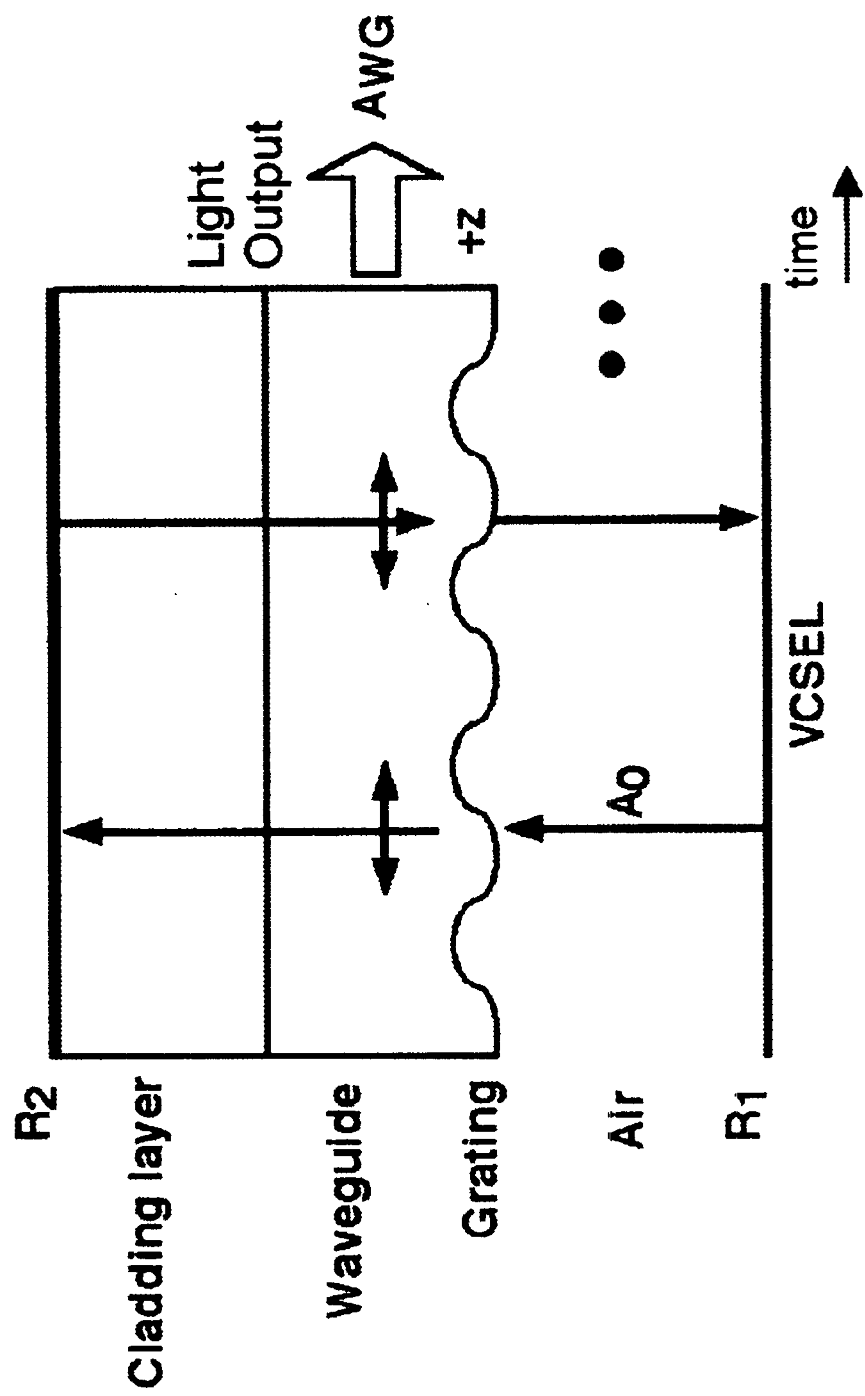
FIG. 22 illustrates a superposition of the waveguide coupler.

FIG. 22 is a model which shows the coupling of the VCSEL output into the waveguide through the grating. Collimated light from the VCSEL is emitted in the transverse electromagnetic mode $TE_{00}$ ($A_0$). This is depicted by the black arrows in FIG. 22. The grating coupler is designed to separate first-order modes and couple these modes into the waveguide. Through reflection of $R_1$ and $R_2$ the zero-order mode $A_0$, sustains the amplitude of the first-order modes. This is achieved through superposition.

Figure 26:
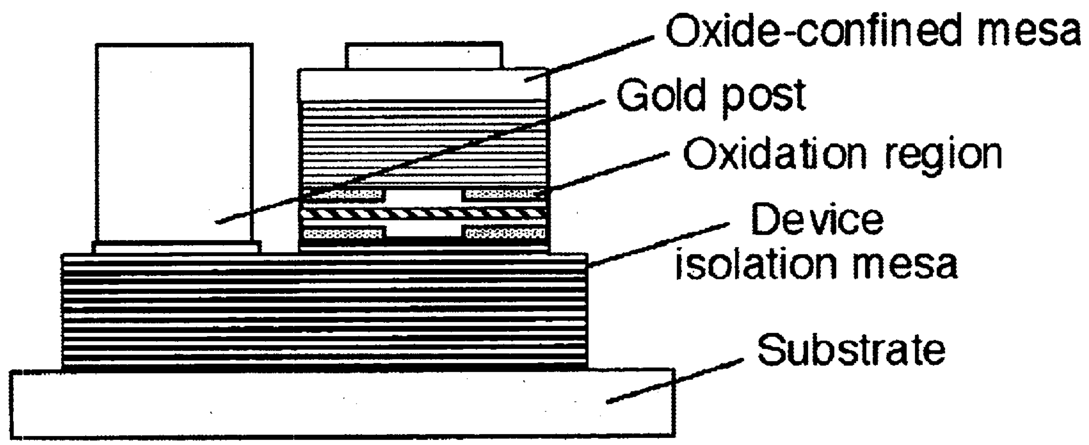
FIG. 26 illustrates an oxide-confined VCSEL structure.

In order to further evaluate the coupling between a VCSEL and a waveguide, a simple equation has been derived which describes the waveguide-coupled output power as a function of grating diffraction efficiency η. The output power coupled into the waveguide can be calculated by considering multiple reflections at the interfaces $R_1$ and $R_2$ as shown in FIG. 26. The coupled-output power ($A_{WG}$) into +z direction is given by:

$$A_{WG} = \frac{\eta}{2}\frac{1 + R_2(1-\eta)}{1 - R_1 R_2 (1-\eta)^2} \tag{1}$$

where, $A_{WG}$ is normalized to the incident beam $A_0$. Equation (1) is derived by assuming that the diffraction efficiency from the waveguide is the same as that from the VCSEL. In addition, the absorption and scattering losses in the waveguide are assumed to be minimal.

The output power coupled into the −z direction is equal to $A_{WG}$. When the grating is assumed to be symmetric, the coupling processes are also symmetric. Therefore, light from the VCSEL is coupled by the surface normal grating coupler and is split into two different directions at the same time with the same magnitude.

Figure 23B:
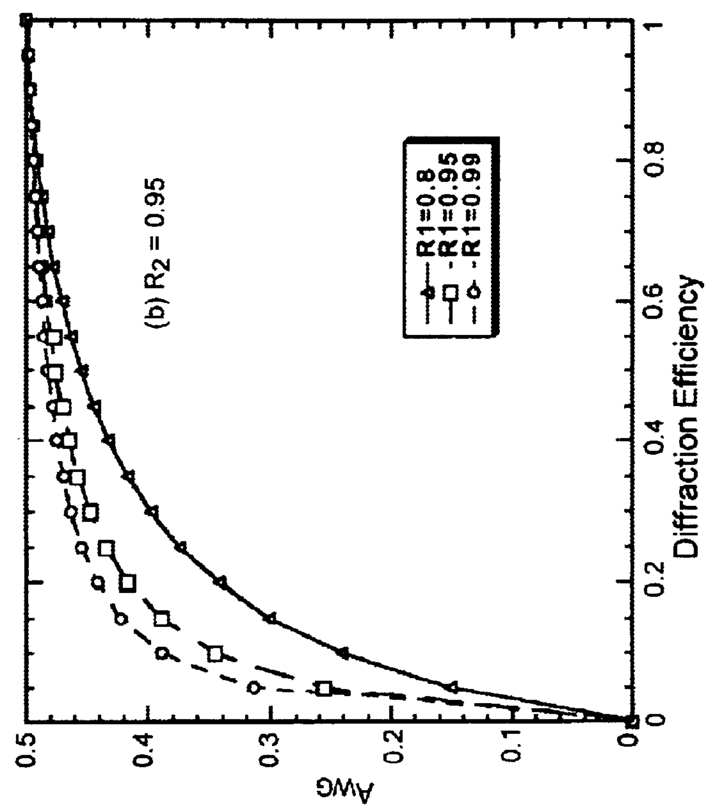
FIGS. 23A and 23B provide calculated output power coupled into the waveguide as a function of diffraction efficiency for the surface normal grating.
Figure 23A:
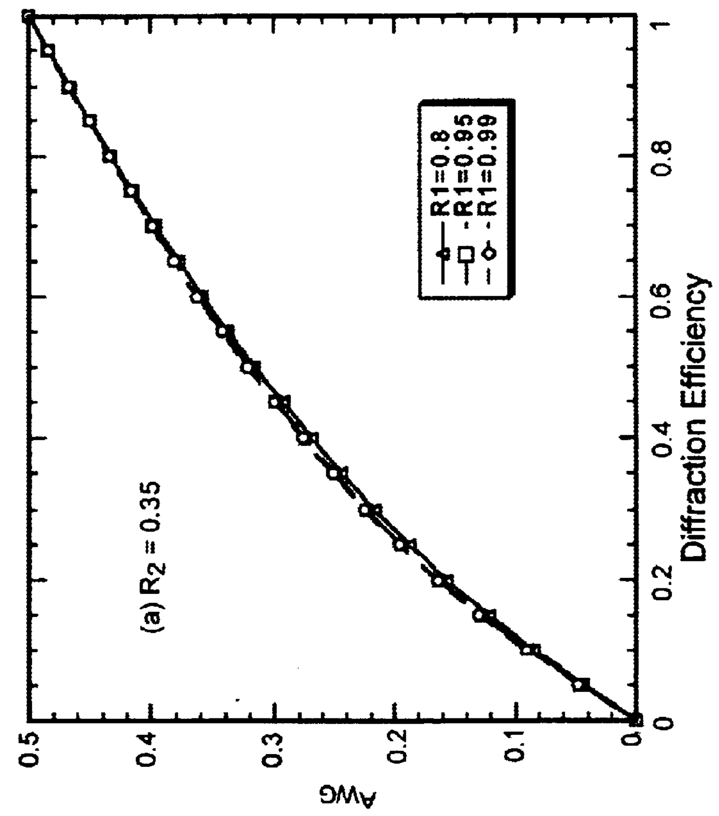

FIGS. 23A and 23B show the calculated output power coupled into the waveguide as a function of the diffraction efficiency for different values of $R_1$ . For an $R_2$ of 0.35, which is shown in FIG. 23A, the normalized output power approximately exhibits a linear dependence on the diffraction efficiency for all values of $R_1$. A reflectivity of $R_2$=0.35 is typical of a GaAs-air interface. In order to increase the guided output, a large $\eta$ is required, which is difficult to realize due to the problems of waveguide materials and grating fabrication technology. The coupling characteristics can be substantially changed if a substrate mirror is used. The coupled output power can be increased by incorporating a highly reflective mirror into the backside of the waveguide structure. This can be accomplished using a simple gold mirror or a semiconductor (dielectric) mirror such as an epitaxially grown distributed Bragg reflector.

FIG. 23B shows the calculated output power for a large $R_2$ of 0.95. Unlike the previous example in FIG. 23A, the coupled output exhibits a nonlinear dependence on h in which the output becomes saturated rapidly with $\eta$. For example, for $\eta$ of 0.1, the normalized output power is >0.4 for $R_1$=0.99. This is four times larger than that of $R_2$=0.35. Therefore, the waveguide grating structure with a highly reflective mirror allows the use of low diffraction efficiency for large coupling efficiency of the VCSEL into the waveguide. As can be seen in FIGS. 23A and 23B, the effect of the substrate reflector on the coupled output power becomes smaller as $\eta$ increases. This is because for high $\eta$, a large amount of VCSEL light is diffracted into the waveguide before it reaches the substrate mirror. For $\eta$ of 1, the coupled output approaches 0.5 normalized power, which is the theoretical maximum. In this case, all the light from the VCSEL is converted into the first-order modes in the waveguide in a single pass.

Based on the coupling calculations for an AlGaAs structure, the waveguide grating will be fabricated. The waveguide will be fabricated for each network processor card. The grating pattern will be continued down the entire length of the waveguide in order to keep the maximum amount of light in the waveguide. Because the grating is continuous, the alignment of the VCSELs and photodetectors to the waveguide is simplified. The assignee of the subject invention has previously developed sensitive photodetectors and receivers. Because of the high sensitivity of the devices, the light from the waveguide can be easily detected. Therefore, this unique waveguide offers a highly efficient means of transferring data across the network.

Vertical Cavity Surface Emitting Laser

Two types of VCSEL structures have been developed for integration into OEICs: ion implanted and oxide-confined. Both 850 nm devices are being fabricated from a GaAs/AlGaAs p-i-n distributed Bragg reflector (DBR) structure, which is grown by metal organic chemical vapor deposition (MOCVD).

Ion Implanted VCSELs

Figure 24:
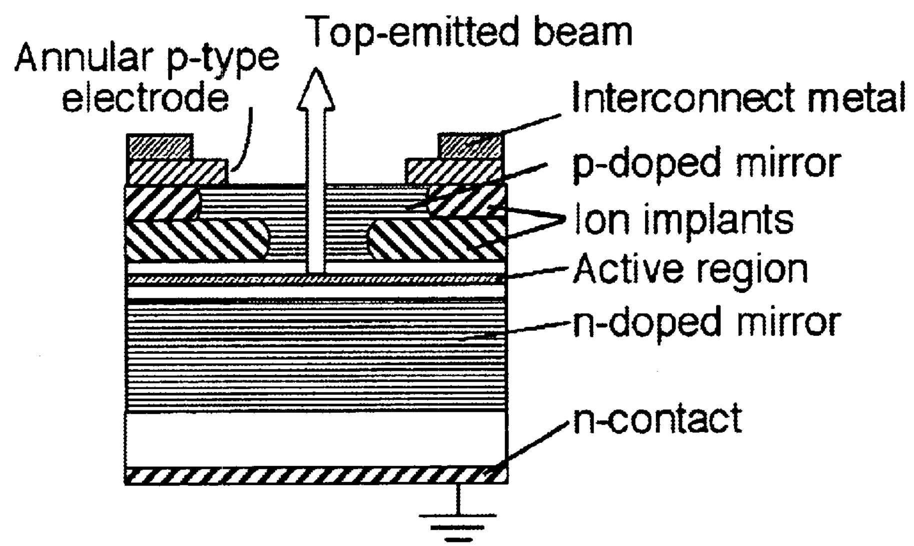
FIG. 24 illustrates an Ion implanted VCSEL: structure.

The ion implanted VCSEL (FIG. 24) is a gain-guided, top-surface emitting device in which current confinement and electrical isolation of adjacent lasers is accomplished through hydrogen ion implantation.

Ion implanted VCSEL arrays have been fabricated in 4×4, 8×8, and 16×16 arrays on 512 mm centers.

The top emitting VCSEL epitaxy has been designed to operate at 850 nm. This epitaxial structure has a top mirror stack which comprises 22 periods of quarter-wave thick $Al_{0.85}Ga_{0.15}As/Al_{0.16}Ga_{0.84}As$ Bragg reflectors and a bottom mirror stack which comprises 35.5 periods of quarter-wave thick $Al_{0.85}Ga_{0.15}As/Al_{0.16}Ga_{0.84}As$ Bragg reflectors. The heterointerfaces of the mirror layers are linearly graded over a distance of 200 Å in order to reduce the series resistance in the mirror stacks.

The active region utilizes three 70 Å-thick GaAs quantum wells with two 70 Å-thick $Al_{0.16}Ga_{0.84}As$ barriers.

Figure 25C:
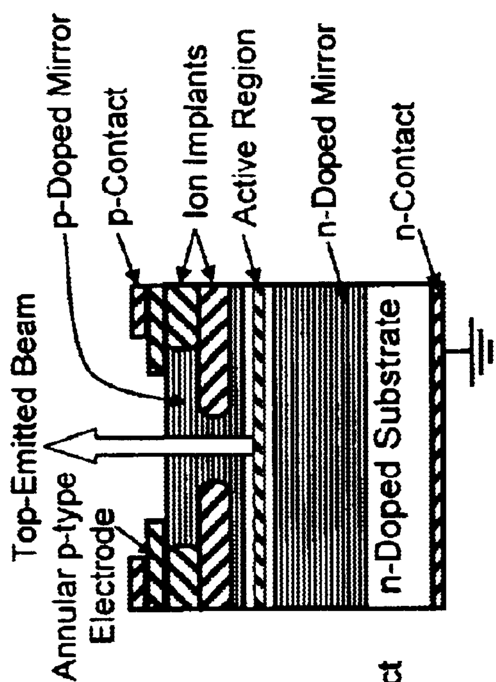
FIGS. 25(*a*) to 25(*c*) illustrate VCSEL processing after ion implantation—FIG. 25(*a*) P-type ohmic contacts, FIG. 25(*b*) N-type ohmic contacts.
Figure 25B:
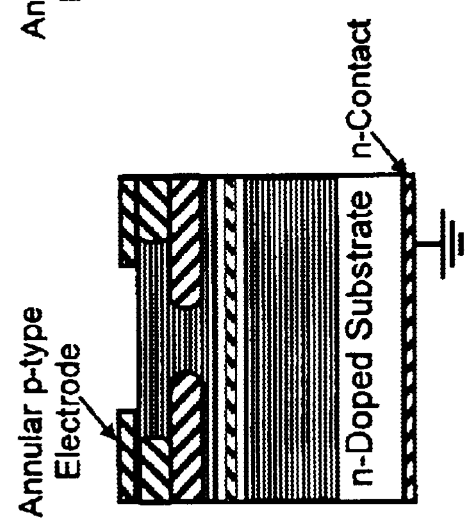
Figure 25A:
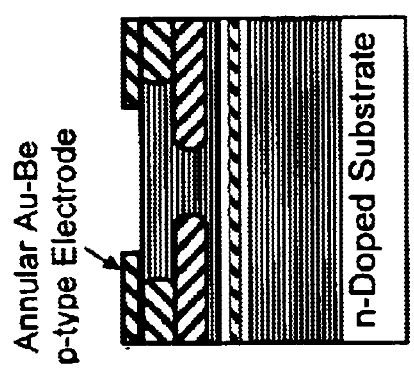

The detailed VCSEL processing sequence is shown in part in FIG. 25A to 25C. The VCSEL epitaxy is patterned with an alignment mark using a combination of citric acid and hydrogen peroxide. These etched alignment marks make it possible to align the subsequent mask steps, because the ion implants cannot be seen on the wafer surface. Next, a thick photoresist is patterned on the epitaxy. The wafer is then bombarded with ions which causes damage to the structure everywhere except the areas protected by the photoresist. This deep implant damages the epitaxy and confines the current to the center of the device above the active region. It is important to avoid damaging the quantum wells during the implantation because this would result in an excessively large "radiative recombination" current and prevent the devices from lasing. Another thick photoresist is deposited for a shallower ion implantation, which is used to provide isolation between the devices.

FIGS. 25A to 25C show the processing steps required after ion implantation. The p-ohmic contact, comprising Au/Zn/Au, is evaporated and patterned using lift-off (FIG. 25A). The n-ohmic contact, which is a deposition of Ni/AuGe/Ni/Au layers, is evaporated and commonly connected through the substrate (FIG. 25B). The contacts are annealed in a rapid thermal annealer in order to provide low resistance electrical connections. Finally, layers of Ti/Au are deposited by evaporation and lift-off for the interconnect metals and the bond pads (FIG. 25C).

Oxide-Confined VCSELs

A bottom-emitting, oxide-confined VCSEL structure which requires flip-chip bonding to CMOS and subsequent substrate removal is also being developed for implementation into the 32×16 smart pixel HPOC module. Oxide-confined VCSELs are being designed and fabricated under a Cooperative Research and Development Agreement (CRADA) with Dr. Kent Choquette of the Photonics Research Department at Sandia National Laboratories. Either device could be incorporated into the virtual crossbar.

FIG. 26 shows a schematic of an oxide-confined VCSEL. First, a Ti/Au p-contact is deposited using electron beam evaporation. The mesa is then created using reactive ion etching (RIE). The mesa exposes the AlGaAs layers for subsequent oxidation. The diameter of the central VCSEL mesa should be designed in such a way that the mesa diameter is small enough to minimize the lateral oxidation distances, and large enough to form a reasonable flip-chip bond pad on top.

The next step is to form an n-type ohmic contact. Ge/Au/Ni/Au is deposited using a lift-off process. An oxidation is then performed in a steam furnace with a flow of $N_2$ through a bubbler.

The oxidation defines the current-confinement aperture. The oxidation time is dependent on the size of the VCSEL aperture. By using electroplating, large gold posts are fabricated on the n-contacts.

After gold electroplating, a deep isolation etch is performed. The etch goes through the entire epitaxial structure into the GaAs substrate to separate the individual VCSELs on the substrate.

Thus, when the substrate is removed in flip-chip bonding, each VCSEL will be physically independent of the other VCSELs eliminating any mechanical strain from the substrate.

Photodetector

The Assignee of the subject invention has developed a suite of silicon PIN and GaAs photodetectors which are being integrated into the OEIC devices. The photodetector operates as an optoelectronic converter that generates an electrical current or voltage when the device is illuminated by light.

Si Photodetectors

Arrays of silicon PIN photodetectors have been developed for use with 850 nm VCSELs. The epitaxial structure for the photodetectors have been designed for high speed response and low voltage operation. The design of a silicon PIN photodiode is dependent upon its intended applications. Each application requires different device performance specifications such as the photo-diode bandwidth, responsivity, capacitance, and dark current. The determination of these parameters is important to facilitate the designing of a photodiode in which trade-off between various parameters need to be known.

The depletion region thickness should be tailored to optimize the quantum efficiency and frequency response. A silicon PIN photodetector comprises typically a wide depletion region. The width of the depletion region is established by device construction and reverse bias voltage. Since the depletion region is so wide in PIN photodetectors, typically 10–100 μm, the transit time for carriers to cross the depletion region is a factor to consider in device high frequency response. For high speed operation, the depletion region must be kept thin to reduce the transit time. However, in order to increase the quantum efficiency, the depletion layer must be sufficiently thick enough to allow a large fraction of the incident light to be absorbed. Thus there is a trade-off between the response speed and quantum efficiency.

Figure 27:
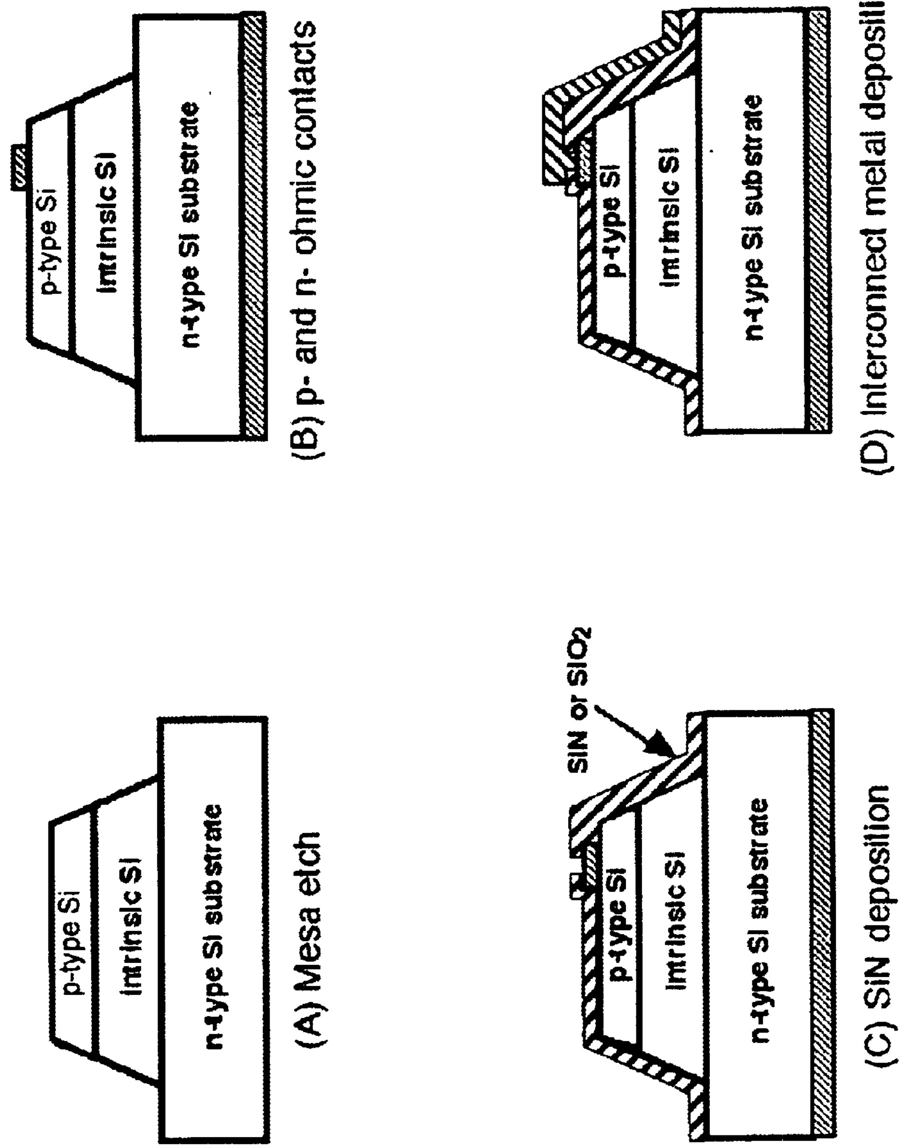
FIGS. 27(*a*) to 27(*d*) show a fabrication sequence of Si photodetectors.

FIGS. 27(*a*) to 27(*d*) show a fabrication sequence of Si photodetectors. Mesa etching is first performed using a Si etchant which consists of a mixture of hydrofluoric acid (HF) with nitric acid ($HNO_3$) (FIG. 27(*a*)). Silicon nitride (SiN) and thick photoresist films are used as an etch mask layer. Mesas are formed to electrically isolate the adjacent devices. Care should be taken in the etching process to precisely control the mesa height because a deep mesa structure makes subsequent photolithography processes difficult. In addition, it may cause a possible metal step coverage problem in interconnection metallization.

An n-ohmic metal, Pt/Ti/Au is then deposited using e-beam evaporator. The samples are annealed in a 620° C. furnace for 10 min in nitrogen ambient in order to make a good ohmic contact to an n-type Si substrate. After the n-ohmic contact is formed, a p-metal is deposited using standard UV photolithography. The p-ohmic metal is achieved by the deposition of Ti/Au in the e-beam evaporator. The sample is annealed in a 420° C. furnace for 2 minutes to form a p-ohmic contact.

FIG. 27(*b*) shows a schematic drawing of the detector after ohmic metallization. After the ohmic metal deposition, SiN is deposited using PECVD (FIG. 27(*c*)). Since SiN is a dielectric material, it provides electrical isolation between the interconnect metal and the doped epitaxial layers. SiN is also used for the anti-reflection (AR) coating. For 850 nm photodetectors, quarter-wave thick (~1100 Å) is used for AR coating. The index of refraction of the PECVD deposited SiN ranges from 1.9 to 2.2 depending on the amount of hydrogen concentration in the SiN film. The SiN film has to be completely removed from the p-ohmic metal before the interconnect metal is evaporated. The etching of the SiN film can be accomplished with a Buffered HF (BHF) etch. Finally, the interconnect metal and bond pads (Ti/Au) are patterned and deposited in the e-beam evaporator for electrical probing (FIG. 27(*d*)).

Resonant Cavity Enhanced Photodetectors

GaAs photodetectors have also been fabricated from the same semiconductor materials as the VCSELs. The RCE photodetectors contain distributed Bragg reflectors which are epitaxially grown on a GaAs substrate. The photodetectors are processed by removing selected layers from the top mirror in the VCSEL epitaxial structure. A 2D bottom receiving detector array is also being developed for subsequent flip-chip bonding to a VCSEL/CMOS array to form a smart pixel device.

Figure 28:
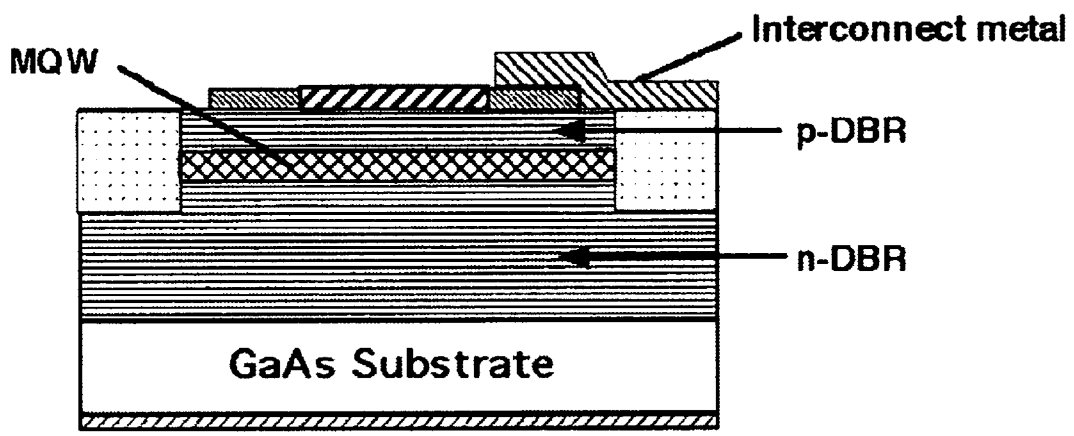
FIG. 28 shows a RCE detector fabricated from the same epitaxy as the VCSEL.

FIG. 28 shows a schematic and photo of an RCE photodetector fabricated from the VCSEL epitaxy. The top mirror layers were removed using selective etchants. A p-ohmic metal was then patterned using standard UV photolithography. The Au/Zn/Au was then deposited in a thermal evaporator. After the p-ohmic metal was formed using a lift-off technique, an n-metal was deposited. The n-ohmic metal was achieved by the deposition of Ni/AuGe/Ni/Au in the e-beam evaporator.

The sample was annealed in a rapid thermal annealer (RTA) at 420° C. for 10 seconds to form n- and p-ohmic contacts. After the ohmic metal deposition, device isolation was achieved through wet etching of the mesa in a phosphoric acid ($H_3PO_4$), $H_2O_2$ and Dl (1:8:50) mixture for about 2 minutes. The advantage of using this particular etchant is that due to the isotropic etching characteristics, the sidewall of the mesa was tapered. As a result, the interconnect metal deposition provided good sidewall coverage.

After the device isolation etch, the sample was loaded into a thermal evaporator to deposit the anti-reflective (AR) coating. For 850 nm RCE detectors, quarter-wave thick (~1225 Å) SiO is used for the AR coating. The index of refraction of the thermal evaporated SiO ranges from 1.9 to 2.1 depending on the amount of material present in the effusion cell. Since SiO is a dielectric material, it could also be used to provide electrical isolation between the interconnect metal and the doped epitaxial layers. The SiO film had to be completely removed from the p-ohmic metal before the interconnect metal was evaporated. The etching of the SiO film can be accomplished with a $CF_4$ plasma etch at ~100 mW RF power for ~2 minutes. Finally, the interconnect metal and bond pads (Ti/Au) were patterned and deposited in the e-beam evaporator for electrical probing.

Smart Pixel Arrays

VCSELs and photo-detectors are being integrated onto CMOS circuitry to form large 2D smart pixel arrays.

Figure 29A:
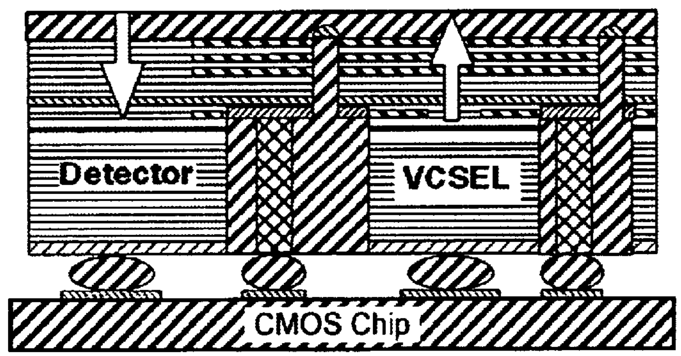
FIG. 29A shows a schematic representation of a monolithic VCSEL and photodetector flip-chip bonded onto a CMOS array.
Figure 29B:
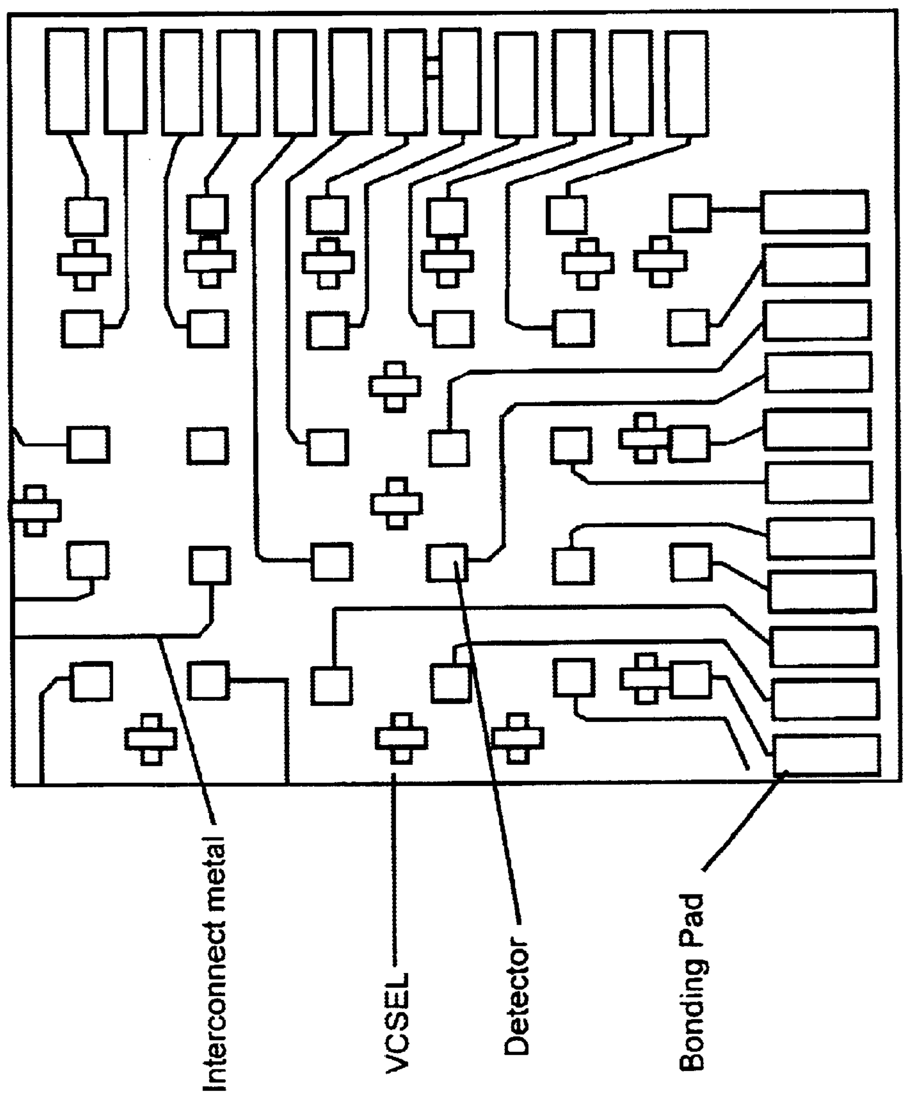
FIG. 29B is photograph of a monolithic VCSEL and photodetector array.

FIG. 29A shows a schematic representation of a monolithic VCSEL and photodetector flip-chip bonded onto a CMOS array. FIG. 29B is photograph of a monolithic VCSEL and photodetector array.

Using 0.5 μm technology, a simulated performance of >1 GHz per pixel has been demonstrated. One of the features of this chip is the ability to turn on entire columns of VCSELs independently of each other. Flip-chip bonding can be quickly tested with a single dedicated VCSEL and a single dedicated photo-detector.

Individual smart pixel cells may be selected to operate particular devices. The chip also contains a 15-bit random clock generator which is serially shifted through all 512 smart pixels. There is an on-chip clock generator which can be bypassed in favor of an external clock as well as a clock output trigger which can be used for synchronization with BER (bit error rate) test equipment. The CMOS chips will be flip-chip bonded to 32×≠oxide-confined VCSEL arrays and photodetector arrays.

Figure 30:
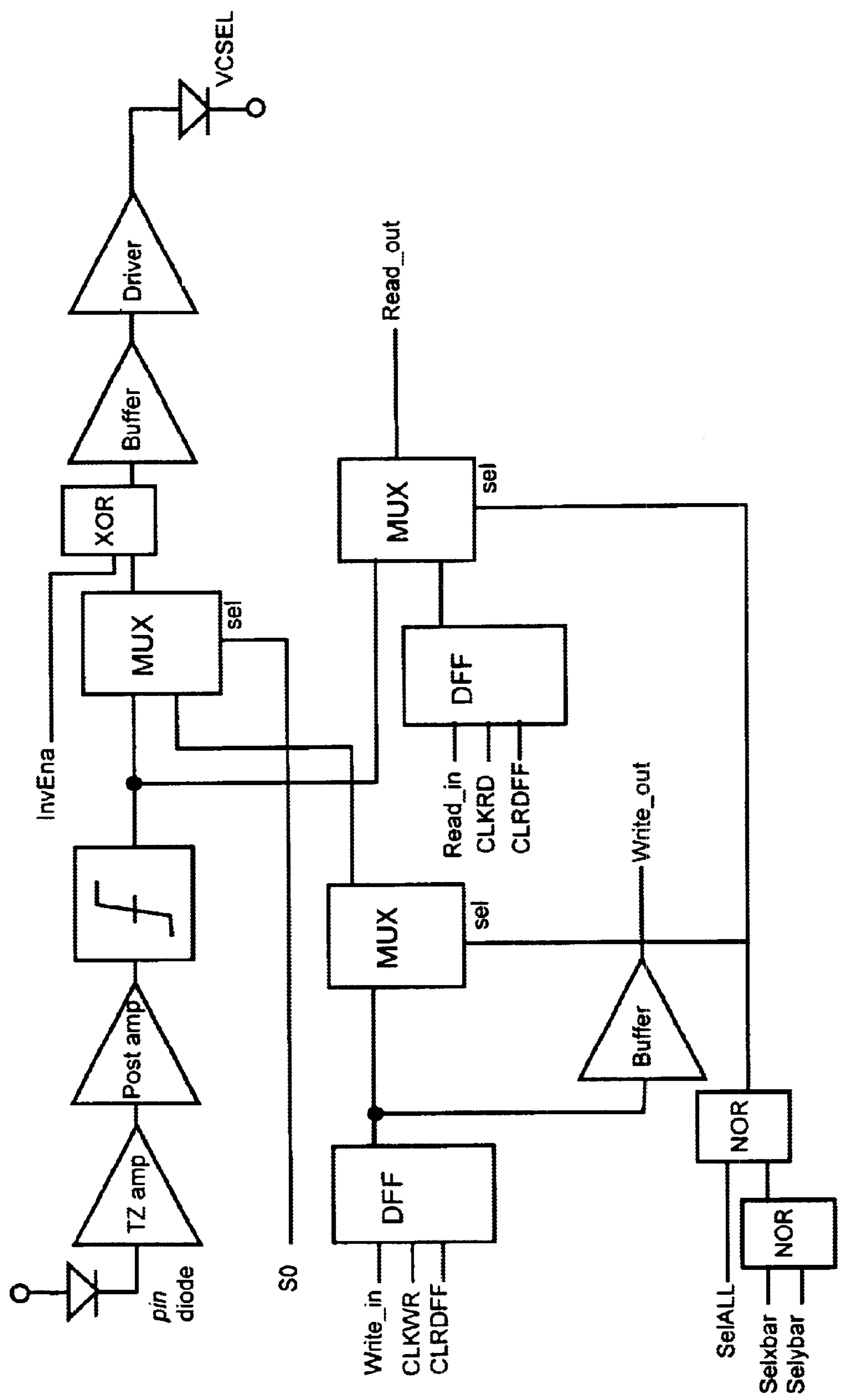
FIG. 30 shows a schematic of an individual smart pixel which includes a receiver, digital circuitry, and a laser driver.

FIG. 30 shows a schematic of an individual smart pixel which comprises a receiver, digital circuitry, and a laser driver. The receiver comprises a transimpedance (TZ) amplifier, multiple stages of post amplifiers, and a decision circuit to convert the photodetector current to a CMOS/logic level. A pseudo NMOS TZ receiver is incorporated into this design for high speed operation. Bypass capacitors were added to shield the receiver from noise. The output of the receiver is transmitted to the digital section of the smart pixel circuit.

Each smart pixel array contains a single D-FF (digital flip-flop) for memory. The I/O circuitry contains multiplexers and D flip-flops which allow the input to be loaded either electronically or from the photodetector into each pixel and transmitted to the VCSEL. This permits the smart pixel to operate in four modes: (a) optical-in/optical-out; (b) electrical-in/electrical-out; (c) optical-in/electrical-out; and (d) electrical-in/optical-out (i.e., the smart pixel can act as a receiver, a transmitter, or a transceiver.). Since the smart pixel also contains a 1-bit RAM, data can be written, stored, and read later. The internal functions of the digital section are controlled by external control pins. Smart pixels can be connected in series via read and write lines so that the entire smart pixel array can be configured as a single shift register. The smart pixel arrays are linked together serially to form a 512 bit memory.

A laser diode driver was designed to operate a low-threshold, oxide-confined VCSEL. The VCSEL driver circuit comprises two PMOS transistors connected in parallel, which are designed to source the current so that they are connected to the anode of the VCSEL. The driver provides high-speed switching between two current levels: one just below laser threshold, and the other above threshold. The pre-bias and modulation current of the VCSEL can be controlled to optimize the VCSEL performance. The VCSEL driver has a maximum of 4 mA of modulation at 5 V, and 10 mA of modulation at 10 V.

One of the critical design elements in the smart pixel is the transimpedance (TZ) amplifier.

The preamplifier stage of the circuit is the first stage of signal amplification; it is also one of the largest contributors of noise in the circuit. This noise is amplified and carried through the circuit along with the signal. Thus, high speed receiver design is very sensitive. Many different types of high speed TZ amplifiers have been designed in 1.2 mm and 0.5 mm technologies. Designs have been simulated up to 1 Gb/s when designed in 0.5 $\mu$m technology.

Figure 31:
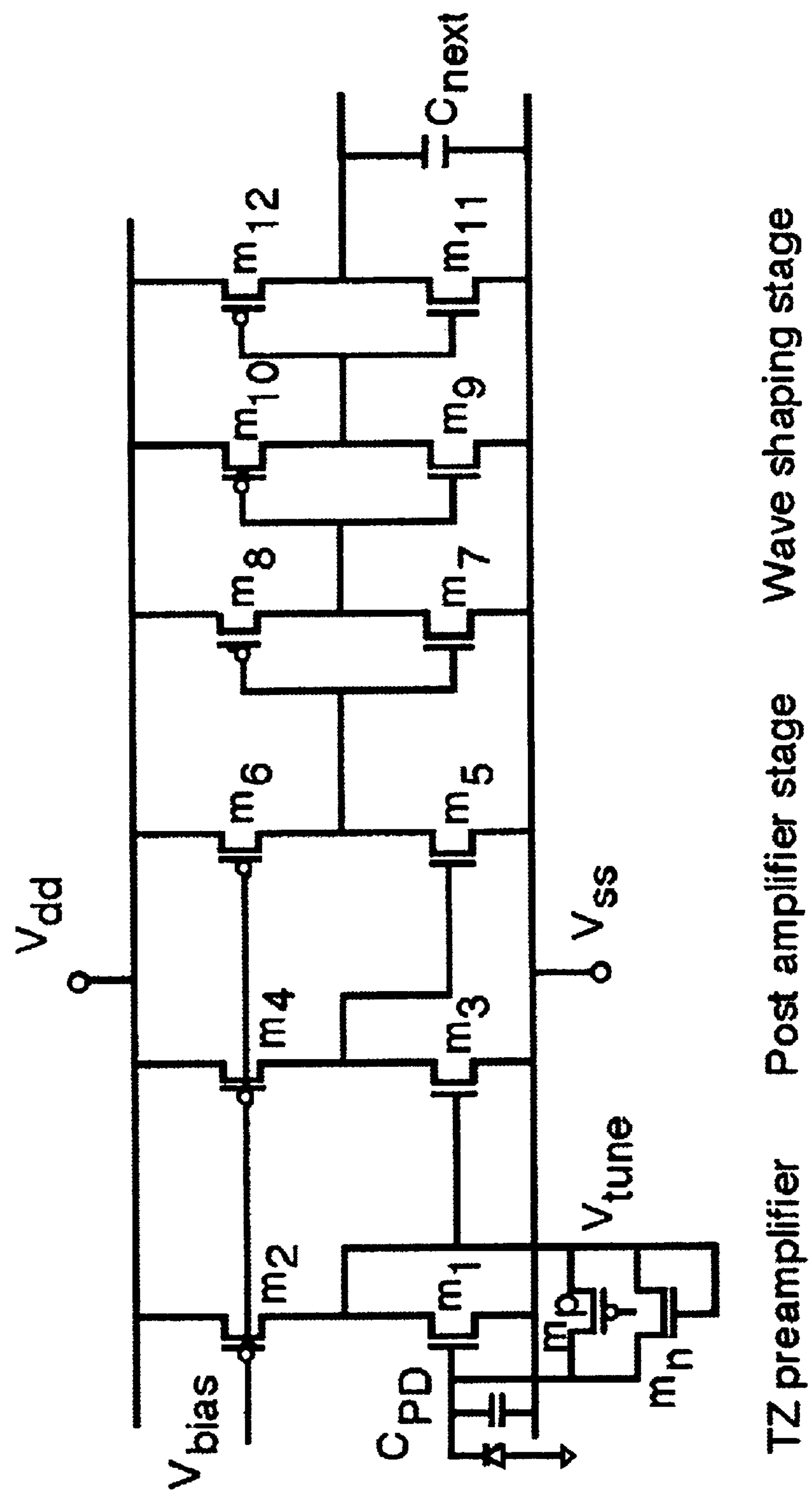
FIG. 31 is a schematic diagram of a one-stage pseudo-NMOS transimpedance amplifier.

A single-ended, pseudo-NMOS, optical receiver were fabricated using 1.2 $\mu$m CMOS technology at MOSIS. FIG. 31 shows a schematic diagram of the receiver.

The length of all the analog transistors was set to a minimum value of 3 $\lambda$ where $\lambda$=0.6 $\mu$m for 1.2 $\mu$m CMOS process (digital transistors have a 2 $\lambda$ minimum length). A reverse-biased silicon PIN photodetector is connected to the input of the TZ preamplifier in a current-sink configuration.

The transimpedance preamplifier comprises a pseudo-NMOS configuration (transistors $m_1$ and $m_2$). A DC-biased PMOS load $m_2$ is connected, to a common-source amplifier $m_1$. The frequency response of the preamplifier showed that the transimpedance gain of the input preamplifier stage was 84.43 dBΩ. The bandwidth of the TZ preamplifier is 248.5 MHz for feedback control voltage, $V_{tune}$, of −1.8 V.

The post amplifier stage was designed with pseudo-NMOS amplifiers, as shown in FIG. 31. The first stage post amplifier comprises transistors $m_3$ and $m_4$. The second stage comprises $m_5$ and $m_6$. As shown in FIG. 31, wave shaping stages comprises three stage CMOS inverters: transistors $m_7/m_8$, $m_9/m_{10}$, and $m_{11}/m_{12}$.

The present invention has been described above with reference to a several different embodiments. However, those skilled in the art will recognize that changes and modifications may be made in the above described embodiments without departing from the scope of the invention. Furthermore, while the present invention has been described in connection with a specific processing flow, those skilled in the are will recognize that a large amount of variation in configuring the processing tasks and in sequencing the processing tasks may be directed to accomplishing substantially the same functions as are described herein. These and other changes and modifications which are obvious to those skilled in the art in view of what has been described herein are intended to be included within the scope of the present invention.

What is claimed is:

1. A virtual distributed optoelectronic crossbar network comprising a plurality of processor nodes;

a plurality of optical paths;

wherein each of the processor nodes includes a plurality of vertical cavity surface emitting laser diodes;

one or more photodetectors; and a resonant cavity waveguide grating coupler positioned to couple light from the plurality of optical paths into the one or more photodetectors, and to couple light from the plurality of vertical cavity surface emitting laser diodes into the plurality of optical paths.

2. The virtual distributed optoelectronic crossbar network of claim 1, wherein the optical paths are optical fibers.

3. The virtual distributed optoelectronic crossbar network of claim 1, wherein the optical paths are free space.

4. A virtual distributed optoelectronic crossbar network comprising a plurality of processor nodes;

a plurality of optical paths;

wherein each of the processor nodes includes a plurality of vertical cavity surface emitting laser diodes;

one or more photodetectors; and a resonant cavity waveguide grating coupler positioned to couple light from the plurality of optical paths into the one or more photodetectors, and to couple light from the plurality of vertical cavity surface emitting laser diodes into the plurality of optical paths;

the virtual distributed optoelectronic crossbar network further including a network controller communicating with each of the plurality of processor nodes, and further wherein each of the plurality of processor nodes includes an address decoder which communicates with the network controller, and which enables ones of the plurality of vertical cavity surface emitting laser diodes in response to addresses from the network controller;

wherein each of the plurality of vertical cavity surface emitting laser diodes is coupled by the resonant cavity waveguide grating coupler to a different one of plurality of optical paths; and a single photodetector is coupled to an assigned optical path.

5. The virtual distributed optoelectronic crossbar network of claim 4, wherein for each node, only one vertical cavity surface emitting laser diode operates at any point in time.

6. The virtual distributed optoelectronic crossbar network of claim 4 wherein multiplexing of optical signals to the processor nodes is performed through independent optical paths, for independent processors nodes.

7. A virtual distributed optoelectronic crossbar network comprising a plurality of processor nodes;

a plurality of optical paths;

wherein each of the processor nodes includes a plurality of vertical cavity surface emitting laser diodes;

one or more photodetectors; and a resonant cavity waveguide grating coupler positioned to couple light from the plurality of optical paths into the one or more photodetectors, and to couple light from the plurality of vertical cavity surface emitting laser diodes into the plurality of optical paths;

further wherein for each of the plurality of processor nodes each of the plurality of vertical cavity surface emitting laser diodes is coupled by the resonant cavity waveguide grating coupler to a different one of plurality of optical paths;

a first of the one or more photodetectors is coupled to an assigned optical path; and others of the one or more photodetectors are coupled to a different one of the plurality of optical paths and detect traffic on the assigned optical path.

8. A virtual distributed optoelectronic crossbar network comprising a plurality of processor nodes;

a plurality of optical paths;

wherein each of the processor nodes includes a plurality of vertical cavity surface emitting laser diodes;

one or more photodetectors; and a resonant cavity waveguide grating coupler positioned to couple light from the plurality of optical paths into the one or more photodetectors, and to couple light from the plurality of vertical cavity surface emitting laser diodes into the plurality of optical paths;

wherein the plurality of optical paths are located in a single physical medium;

for each of the plurality of processor nodes each of the plurality of vertical cavity surface emitting laser diodes operate at different wavelengths; and the photodetectors are resonance cavity detectors.

9. The virtual distributed optoelectronic crossbar network of claim 8, wherein each of the plurality of processor nodes further includes additional pluralities of vertical cavity surface emitting laser diodes, wherein each of the plurality of vertical cavity surface emitting laser diodes in the additional groups operate at different wavelengths; and additional pluralities of photodetectors, wherein each photodetector in the additional pluralities of photodetectors groups is a resonant cavity enhanced photodetector responsive to a different wavelength.

10. The virtual distributed optoelectronic crossbar network of claims 4, 7, 8 or 9, wherein the optical paths are optical fibers.

11. The virtual distributed optoelectronic crossbar network of claims 4, 7, 8 or 9, wherein the optical paths are free space.

12. The virtual distributed optoelectronic crossbar network of claims 4, 7, 8, or 9, wherein the plurality of optical paths is bi-directional.

13. The virtual distributed optoelectronic crossbar network of claims 4, 7, 8, or 9, wherein the plurality of optical paths are provided in waveguides.

14. The virtual distributed optoelectronic crossbar network of claim 8 wherein the optical paths are located in a single optical fiber.

15. A virtual distributed optoelectronic crossbar backplane comprising a plurality of backplane nodes;

a plurality of optical paths;

wherein each of the plurality of backplane nodes includes a plurality of vertical cavity surface emitting laser diodes;

a plurality of photodetectors;

an electrical connector coupled to the plurality of vertical cavity surface emitting laser diodes and the plurality of photodetectors;

circuitry coupled to drive the plurality of vertical cavity surface emitting laser diodes and responsive to signals from the electrical connector, and to provide signals to the electrical connector in response to the plurality of photodetectors; and a resonant cavity waveguide grating coupler spanning the plurality of backplane nodes and providing the plurality of optical paths, wherein the resonant cavity waveguide grating coupler is positioned to couple light from the plurality of optical paths into the photodetectors of the plurality of back plane nodes, and to couple light from the vertical cavity surface emitting laser diodes of the plurality of backplane nodes into the plurality of optical paths.

16. The virtual distributed optoelectronic crossbar backplane of claim 15, wherein the resonant cavity waveguide grating coupler includes optical fibers.

17. A virtual distributed optoelectronic crossbar network comprising a plurality of processor nodes;

a plurality of optical paths;

wherein each of the processor nodes includes a plurality of vertical cavity surface emitting laser diodes;

one or more photodetectors; and a resonant cavity waveguide grating coupler positioned to couple light from the plurality of optical paths into the one or more photodetectors, and to couple light from the plurality of vertical cavity surface emitting laser diodes into the plurality of optical paths;

wherein the plurality of optical paths is bi-directional.

18. A virtual distributed optoelectronic crossbar network comprising a plurality of processor nodes;

a plurality of optical paths;

wherein each of the processor nodes includes a plurality of vertical cavity surface emitting laser diodes;

one or more photodetectors; and a resonant cavity waveguide grating coupler positioned to couple light from the plurality of optical paths into the one or more photodetectors, and to couple light from the plurality of vertical cavity surface emitting laser diodes into the plurality of optical paths;

wherein the plurality of optical paths are provided in waveguides.

* * * * *